US011869477B2

(12) United States Patent
Bou Daher et al.

(10) Patent No.: US 11,869,477 B2
(45) Date of Patent: Jan. 9, 2024

(54) NOISE CANCELLATION SIGNAL SATURATION CONTROL

(71) Applicant: Bose Corporation, Framingham, MA (US)

(72) Inventors: Elie Bou Daher, Marlborough, MA (US); Cristian Marius Hera, Lancaster, MA (US); Siamak Farahbakhsh, Waltham, MA (US)

(73) Assignee: Bose Corporation, Framingham, MA (US)

( * ) Notice: Subject to any disclaimer, the term of this patent is extended or adjusted under 35 U.S.C. 154(b) by 4 days.

(21) Appl. No.: 17/594,081

(22) PCT Filed: Mar. 31, 2020

(86) PCT No.: PCT/US2020/025962
§ 371 (c)(1),
(2) Date: Oct. 1, 2021

(87) PCT Pub. No.: WO2020/205864
PCT Pub. Date: Oct. 8, 2020

(65) Prior Publication Data

US 2022/0180852 A1 Jun. 9, 2022

Related U.S. Application Data

(60) Provisional application No. 62/827,503, filed on Apr. 1, 2019.

(51) Int. Cl.
*G10K 11/178* (2006.01)
*H04R 3/00* (2006.01)

(52) U.S. Cl.
CPC .. *G10K 11/17879* (2018.01); *G10K 11/17833* (2018.01); *H04R 3/00* (2013.01); *G10K 2210/1282* (2013.01); *H04R 2499/13* (2013.01)

(58) Field of Classification Search
CPC ....... G10K 11/17879; G10K 11/17833; G10K 2210/1282; H04R 3/00; H04R 2499/13; H04R 3/007
See application file for complete search history.

(56) References Cited

U.S. PATENT DOCUMENTS 5,627,896 A * 5/1997 Southward ....... G10K 11/17854 381/71.11
2001/0046301 A1 11/2001 Nakamura et al.
(Continued)

FOREIGN PATENT DOCUMENTS

CN 101859563 A 10/2010
CN 101903942 A 12/2010
(Continued)

OTHER PUBLICATIONS

International Preliminary Report on Patentability, International Patent Application No. PCT/US2020/025962, pp. 1-8, dated Sep. 28, 2021.

(Continued)

*Primary Examiner* — Jason R Kurr
(74) *Attorney, Agent, or Firm* — Bond, Schoeneck & King, PLLC

(57) ABSTRACT

A noise-cancellation system includes a noise-cancellation filter in communication with at least one speaker, the noise-cancellation filter generating a noise-cancellation signal that, when actuated by the at least one speaker, cancels noise within at least one cancellation zone; and an amplifier disposed between the noise-cancellation filter and the speaker, the amplifier applying a first scaling gain to the noise-cancellation signal and outputting an scaled noise-cancellation signal, the scaled noise-cancellation signal being a linear reduction of the noise-cancellation signal when the first scaling gain is less than unity, wherein the first
(Continued)

scaling gain is set to less than unity in response to a signal representative of the noise-cancellation signal exceeding a threshold.

16 Claims, 19 Drawing Sheets

(56) References Cited

U.S. PATENT DOCUMENTS

| | | | | |
|---|---|---|---|---|
| 2004/0178852 | A1* | 9/2004 | Neunaber | H03G 11/04<br>330/284 |
| 2008/0075304 | A1 | 3/2008 | Romesburg | |
| 2012/0308021 | A1* | 12/2012 | Kwatra | G10K 11/17881<br>381/71.1 |
| 2015/0104031 | A1* | 4/2015 | Park | G10K 11/17854<br>381/71.6 |
| 2016/0284337 | A1 | 9/2016 | Inoue | |
| 2018/0190258 | A1* | 7/2018 | Mohammad | G10L 15/02 |
| 2018/0240452 | A1 | 8/2018 | Every | |
| 2019/0130930 | A1* | 5/2019 | Tong | G10L 21/0208 |
| 2022/0210554 | A1* | 6/2022 | Bou Daher | H03G 3/3005 |

FOREIGN PATENT DOCUMENTS

| | | | |
|---|---|---|---|
| CN | 102422346 | A | 4/2012 |
| CN | 102867517 | A | 1/2013 |
| CN | 105612576 | A | 5/2016 |
| CN | 107710785 | A | 2/2018 |
| CN | 108352156 | A | 7/2018 |
| CN | 108470562 | A | 8/2018 |
| JP | H 06-186985 | A | 7/1994 |
| JP | H 08-65200 | A | 3/1996 |
| JP | 2001-333490 | A | 11/2001 |
| JP | 2007-181136 | A | 7/2007 |

OTHER PUBLICATIONS

International Search Report and the Written Opinion of the International Searching Authority, International Patent Application No. PCT/US2020/025962, pp. 1-11, dated Jun. 5, 2020.

Notice of Reasons for Refusal, Japanese Patent Application No. 2021-558815, dated Nov. 30, 2022, pp. 1-8 with pp. 1-4 being a translation.

First Office Action, Chinese Patent Application No. CN202080034917A, dated May 25, 2023, pp. 1-14, with pp. 1-7 being a translation.

Lu, Lu, "Adaptive Filtering Algorithm in the Presence of α-Stable Noise," Doctoral Dissertation, Southwest Jiaotong University, May 2018, pp. 1-151, with pp. 9-10 being a translated abstract.

* cited by examiner

NOISE CANCELLATION SIGNAL SATURATION CONTROL

CROSS REFERENCE TO RELATED APPLICATIONS

The present application is a United States National Stage Application pursuant to 35 U.S.C. § 371 of International Patent Application No. PCT/US2020/025962, filed on Mar. 31, 2020, which claims priority to U.S. Provisional Patent Application Ser. No. 62/827,503, filed on Apr. 1, 2019, which application are herein incorporated by reference in their entireties.

BACKGROUND

This disclosure is generally related to systems for controlling the saturation of a noise-cancellation signal.

SUMMARY

All examples and features mentioned below can be combined in any technically possible way.

According to an aspect a noise-cancellation system includes a noise-cancellation filter in communication with at least one speaker, the noise-cancellation filter generating a noise-cancellation signal that, when actuated by the at least one speaker, cancels noise within at least one cancellation zone; and an amplifier disposed between the noise-cancellation filter and the speaker, the amplifier applying a first scaling gain to the noise-cancellation signal and outputting a scaled noise-cancellation signal, the scaled noise-cancellation signal being a linear reduction of the noise-cancellation signal when the first scaling gain is less than unity, wherein the first scaling gain is set to less than unity in response to a signal representative of the noise-cancellation signal exceeding a threshold.

In an example, the signal representative of the noise-cancellation signal is the noise-cancellation signal.

In an example, the signal representative of the noise-cancellation signal is the scaled noise-cancellation signal during a previous sample.

In an example, the first scaling gain is determined, at least in part, according to an amount by which the signal representative of the noise-cancellation signal exceeds the threshold.

In an example, the amplifier applies a second scaling gain during a following sample, the second scaling gain being determined, at least in part, according to a predetermined ramp-up time and according to the value of the first scaling gain, wherein the second scaling gain has a higher value than the first scaling gain.

In an example, the amplifier applies a second scaling gain during a following sample, the second scaling gain being determined, at least in part, according to the value of a counter and according to the value of the first scaling gain.

In an example, the counter is incremented each sample the noise-cancellation signal exceeds the threshold and is decremented each sample the noise-cancellation signal does not exceed the threshold, wherein the difference between the value of the second scaling gain and the value of first scaling gain is inversely related to the value of the counter.

In an example, the amplifier applies a second scaling gain during a following sample, the second scaling gain being set equal to the first scaling gain summed with a predetermined value.

In an example, the adaptation of the noise-cancellation filter is frozen during each sample that the amplifier applies a gain of less than approximately unity.

In an example, the coefficients of the noise-cancellation filter are transitioned toward a target set of coefficients during a following sample.

According to another aspect, a non-transitory storage medium comprises program code that, when executed by a processor, carries out the steps of: generating, with a noise-cancellation filter, a noise-cancellation signal that, when actuated by at least one speaker, cancels noise within at least one cancellation zone; setting a first scaling gain of an amplifier disposed between the noise-cancellation filter and the speaker to less than unity in response to a signal representative of the noise-cancellation signal exceeding a threshold; and applying, with the amplifier, the first scaling gain to the noise-cancellation signal such that the scaled noise-cancellation signal is a linear reduction of the noise-cancellation signal.

In an example, the signal representative of the noise-cancellation signal is the noise-cancellation signal.

In an example, the signal representative of the noise-cancellation signal is the scaled noise-cancellation signal during a previous sample.

In an example, the first scaling gain is determined, at least in part, according to an amount by which the signal representative of the noise-cancellation signal exceeds the threshold.

In an example, the non-transitory storage medium further stores program code that, when executed by the processor, carries out the steps of setting the amplifier to a second scaling gain, the second scaling gain being determined, at least in part, according to a predetermined ramp-up time and according to the value of the first scaling gain, wherein the second scaling gain has a higher value than the first scaling gain; and applying the second scaling gain during a following sample.

In an example, the non-transitory storage medium further stores program code that, when executed by the processor, carries out the steps of setting the amplifier to a second scaling gain, the second scaling gain being determined, at least in part, according to a value of a counter and according to the value of the first scaling gain; and applying the second scaling gain during a following sample.

In an example, the counter is incremented each sample the noise-cancellation signal exceeds the threshold and is decremented each sample the noise-cancellation signal does not exceed the threshold, wherein the difference between the value of the second scaling gain and the value of the first scaling gain is inversely related to the value of the counter.

In an example, the non-transitory storage medium further stores program code that, when executed by the processor, carries out the steps of setting the amplifier to a second scaling gain, the second scaling gain being equal to the first scaling gain summed with a predetermined value; and applying the second scaling gain during a following sample.

In an example, adaptation of the noise-cancellation filter is frozen during each sample that the amplifier applies a gain of less than approximately unity.

In an example, the non-transitory storage medium further stores program code that, when executed by the processor, carries out the steps of transitioning coefficients of the noise-cancellation filter toward a target set of coefficients during a following sample.

The details of one or more implementations are set forth in the accompanying drawings and the description below.

Other features, objects, and advantages will be apparent from the description and the drawings, and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

In a typical adaptive algorithm filter implementation, such as for noise control systems that work to generate an anti-noise signal, there is no inherent constraint on the level of an output signal (e.g., an anti-noise signal). As a result, to minimize an error signal (e.g., a detected resulting noise in a controlled zone, e.g., after application of the anti-noise signal), the system might end up commanding significantly large signals from a transducer, such as a loudspeaker.

An overly large command signal (alternately referred to in this disclosure as the noise-cancellation signal or the anti-noise signal) might occur for various reasons. For example, divergence of the adaptive algorithm can lead to outputs that are out of control, an error in a secondary path estimate might cause the adaptive algorithm to command large signals to compensate for the error, and/or large reference signals may result in large output signals even when the control coefficients are well behaved. In various examples there may be additional or other causes of saturated (e.g., large amplitude) command signals.

Control of saturation of such a command signal is needed to constrain the output levels, such as anti-noise signal levels (for example in a noise cancelation system such as a road noise cancellation system), and in various examples may adjust adaptive filter coefficients accordingly.

Figure 1:
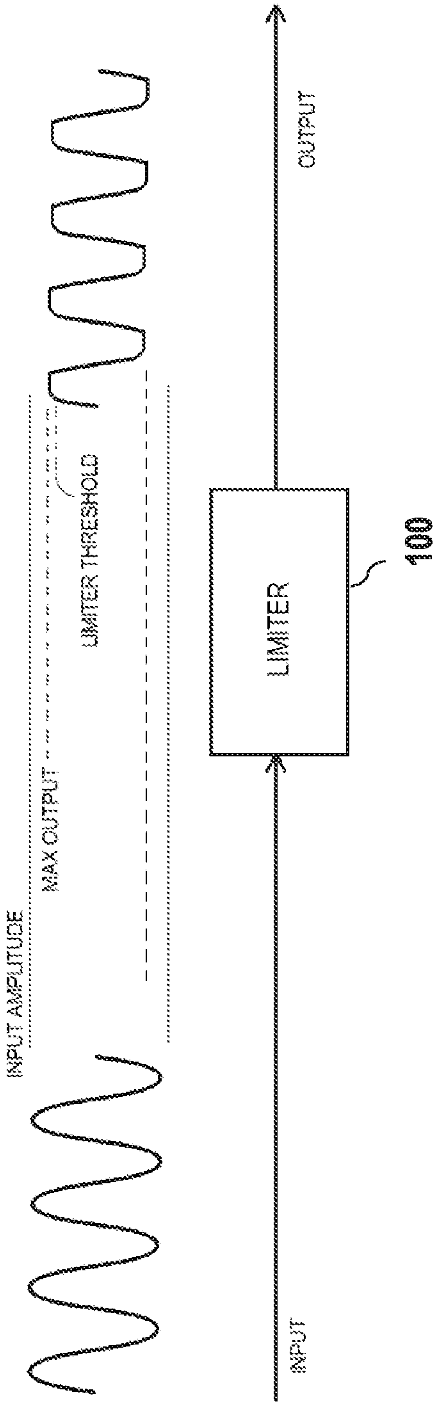
FIG. 1 depicts a block diagram of the operation of a limiter, according to an example.

Attempts to limit the command signal with a limiter can cause non-linearities in the command signal that degrade the performance of the noise-cancellation system, or, worse, add noise to the system. An example of such non-linearities can be seen in FIG. 1. As shown, a sinusoidal signal is input to a limiter 100. The amplitude of the input sinusoidal signal is greater than a threshold applied by the limiter 100. The limiter 100 thus outputs the sinusoid with the peaks of each half-cycle clipped in a non-linear manner. Such a limiter placed at the output of a noise-cancellation filter, while useful for preventing saturation, will produce these undesirable non-linearities.

Figure 2:
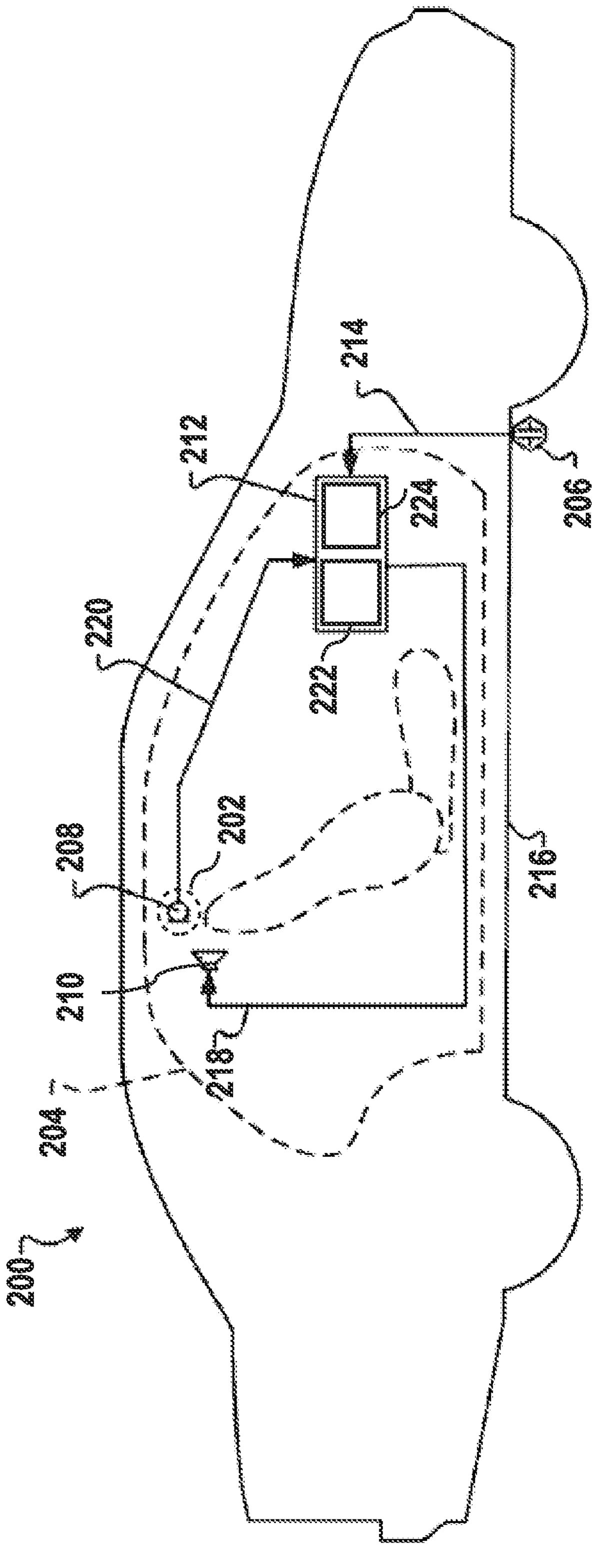
FIG. 2 depicts a vehicle-implemented noise-cancellation system, according to an example.
Figure 3:
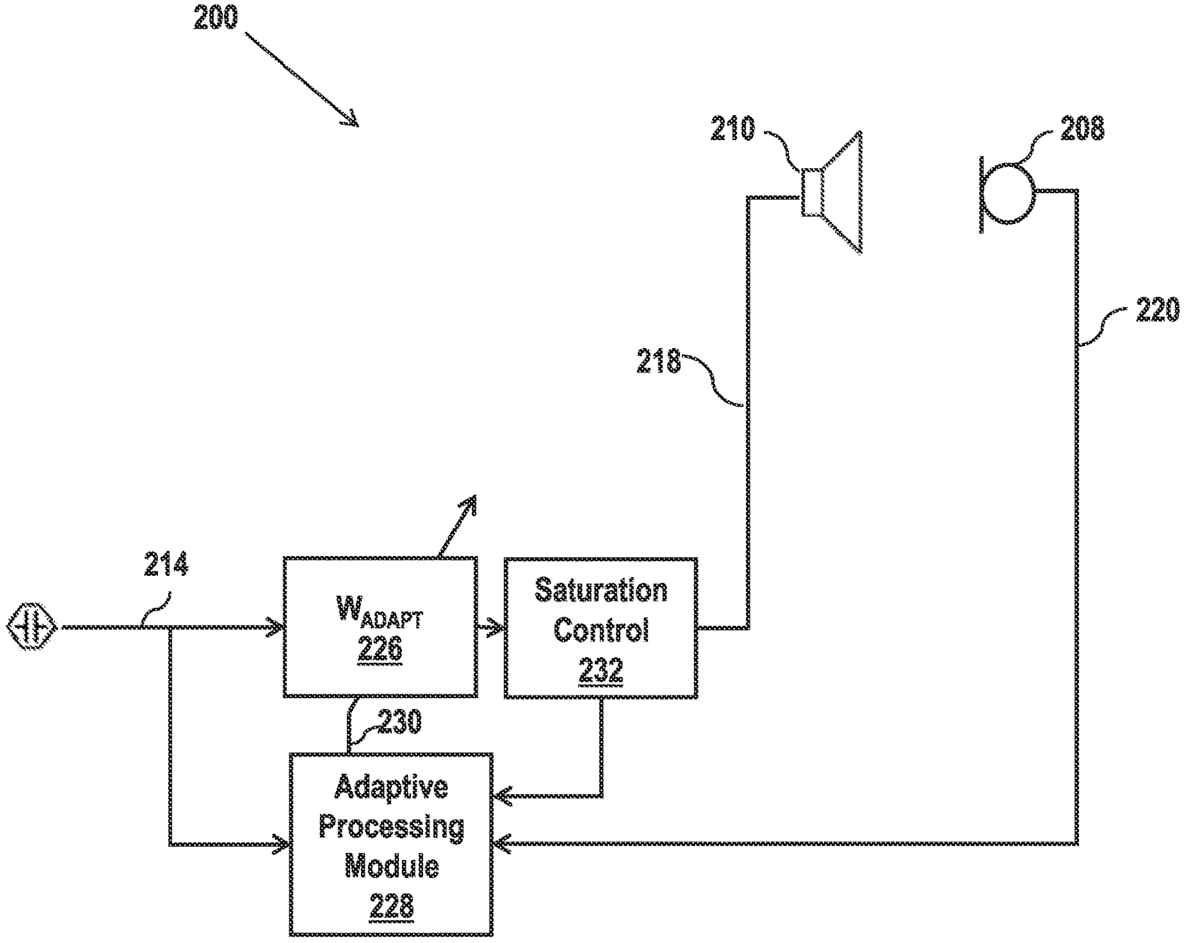
FIG. 3 depicts a block diagram of a noise-cancellation system with saturation control, according to an example.

While the inventive aspects described herein can be implemented in connection with any noise cancellation system, a vehicle-implemented noise-cancellation system, for cancelling road noise, will be briefly described for purposes of illustration in connection with FIGS. 2-3. FIG. 2 is a schematic view of an example noise-cancellation system 200. Noise-cancellation system 200 can be configured to destructively interfere with undesired sound in at least one cancellation zone 202 within a predefined volume 204 such as a vehicle cabin. At a high level, an example of noise-cancellation system 200 can include a reference sensor 206, an error sensor 208, an actuator 210, and a controller 212.

In an example, reference sensor 206 is configured to generate noise signal(s) 214 representative of the undesired sound, or a source of the undesired sound, within predefined volume 204. For example, as shown in FIG. 2, reference sensor 206 can be an accelerometer, or a plurality of accelerometers, mounted to and configured to detect vibrations transmitted through a vehicle structure 216. Vibrations transmitted through the vehicle structure 216 are transduced by the structure into undesired sound in the vehicle cabin (perceived as road noise), thus an accelerometer mounted to the structure provides a signal representative of the undesired sound.

Actuator 210 can, for example, be speakers distributed in discrete locations about the perimeter of the predefined volume. In an example, four or more speakers can be disposed within a vehicle cabin, each of the four speakers being located within a respective door of the vehicle and configured to project sound into the vehicle cabin. In alternate examples, speakers can be located within a headrest, or elsewhere in the vehicle cabin.

A noise-cancellation signal 218 can be generated by controller 212 and provided to one or more speakers in the predefined volume, which transduce the noise-cancellation signal 218 to acoustic energy (i.e., sound waves). The acoustic energy produced as a result of noise-cancellation signal 218 is approximately 180° out of phase with—and thus destructively interferes with—the undesired sound within the cancellation zone 202. The combination of sound waves generated from the noise-cancellation signal 218 and the undesired noise in the predefined volume results in cancellation of the undesired noise, as perceived by a listener in a cancellation zone.

Because noise-cancellation cannot be equal throughout the entire predefined volume, noise-cancellation system 200 is configured to create the greatest noise-cancellation within one or more predefined cancellation zones 202 with the predefined volume. The noise-cancellation within the cancellation zones can effect a reduction in undesired sound by approximately 3 dB or more (although in varying examples, different amounts of noise-cancellation can occur). Furthermore, the noise-cancellation can cancel sounds in a range of frequencies, such as frequencies less than approximately 350 Hz (although other ranges are possible).

Error sensor 208, disposed within the predefined volume, generates an error sensor signal 120 based on detection of residual noise resulting from the combination of the sound waves generated from the noise-cancellation signal 218 and the undesired sound in the cancellation zone. The error sensor signal 220 is provided to controller 212 as feedback, error sensor signal 220 representing residual noise uncanceled by the noise-cancellation signal. Error sensors 208 can be, for example, at least one microphone mounted within a vehicle cabin (e.g., in the roof, headrests, pillars, or elsewhere within the cabin).

It should be noted that the cancellation zone(s) can be positioned remotely from error sensor 108. In this case, the error sensor signal 220 can be filtered to represent an estimate of the residual noise in the cancellation zone(s), which may be considered a projection of the error signal 220, e.g., projecting the error sensor 208 to the cancellation zone, as if the error sensor 208 were located in the cancellation zone. In either case, the error signal will be understood to represent residual undesired noise in the cancellation zone.

In an example, controller 212 can comprise a nontransitory storage medium 222 and processor 224. In an example, non-transitory storage medium 222 can store program code that, when executed by processor 124, implements the various filters and algorithms described below. Controller 212 can be implemented in hardware and/or software. For example, the controller can be implemented by a SHARC floating-point DSP processor, but it should be understood that controller 212 can be implemented by any other processor, FPGA, ASIC, or other suitable hardware.

Turning to FIG. 3, there is shown a block diagram of an example of noise-cancellation system 100, including a plurality of filters implemented by controller 212. As shown, the controller can define a control system including $W_{adapt}$ filter 226 and an adaptive processing module 228, as well as saturation control module 232.

$W_{adapt}$ filter 226 is configured to receive the noise signal 214 of reference sensor 206 and to generate noise-cancellation signal 218. Noise-cancellation signal 218, as described above, is input to actuator 210 where it is transduced into the noise-cancellation audio signal that destructively interferes with the undesired sound in the predefined cancellation zone 202. $W_{adapt}$ filter 226 can be implemented as any suitable linear filter, such as a multi-input multi-output (MIMO) finite impulse response (FIR) filter. $W_{adapt}$ filter 226 employs a set of coefficients which define the noise-cancellation signal 218 and which can be adjusted to adapt to changing behavior of the vehicle response to road input (or to other inputs in non-vehicular noise-cancellation contexts).

The adjustments to the coefficients can be performed by an adaptive processing module 128, which receives as inputs the error sensor signal 220 and the noise signal 214 and, using those inputs, generates a filter update signal 230. The filter update signal 230 is an update to the filter coefficients implemented in $W_{adapt}$ filter 226. The noise-cancellation signal 218 produced by the updated $W_{adapt}$ filter 226 will minimize error sensor signal 220, and, consequently, the undesired noise in the cancellation zone.

The coefficients of $W_{adapt}$ filter 226 at time step n can be updated according to the following equation:

$$W_{adapt}[n+1] = (1-\gamma)W_{adapt}[n] + \mu\left(\tilde{T}'_{de} * H * e\right)\frac{x}{\|x\|_2} \quad (1)$$

where $\tilde{T}_{de}$ is an estimate of the physical transfer function between actuator 210 and the noise-cancellation zone 202, $\tilde{T}_{de}$ is the conjugate transpose of $\tilde{T}_{de}$, e is the error signal, x is the output signal of reference sensor 206, His an optional filter that may apply any or all of energy weighting, shaping, and projection, and $\gamma$ is a leakage factor as known in the art. In the update equation, the output signal x of reference sensor is divided by the norm of x, represented as $\|x\|_2$.

In application, the total number of filters is generally equal to the number of reference sensors (M) multiplied by the number of speakers (N). Each reference sensor signal is filtered N times, and each speaker signal is then obtained as a summation of M signals (each sensor signal filtered by the corresponding filter).

Noise-cancellation system 200 further includes a saturation control module 232 configured to linearly scale the noise-cancellation signal in response to a signal representative of the noise-cancellation signal exceeding a threshold or to transition the coefficients of the noise-cancellation filter to a known value. Various examples of the saturation control module 232 will be discussed in connection with FIGS. 4-9.

Again, the noise-cancellation system 200 of FIGS. 2 and 3 is merely provided as an example of such a system. This system, variants of this system, and other suitable noise-cancellation systems can be used within the scope of this disclosure. For example, while the system of FIGS. 2-3 has been described in conjunction with a least-means-squares filter (LMS), in other examples a different type of filter, such as one implemented with a recursive-lease-squares (RLS) filter can be implemented. Furthermore, while a vehicle-implemented noise-cancellation system for cancelling road noise has been described, any suitable noise-cancellation system can be used.

At a high level, the saturation control module 232 includes an amplifier that applies a scaling gain of less than one to the noise-cancellation signal in response to a signal representative of the noise-cancellation signal exceeding a threshold. When the scaling gain is less than one, the amplifier outputs a scaled noise-cancellation signal that is a linearly reduced version of the noise-cancellation signal. This linearly reduced noise-cancellation signal output from the amplifier is set in an attempt to not saturate the speaker and to not introduce undesirable non-linearities.

In some examples, the value of the scaling gain is determined according to an amount that the signal representative of the noise-cancellation signal exceeds the threshold. In other examples, the scaling gain can be set to a predetermined value following the signal representative of the noise-cancellation signal exceeding the threshold. The signal representative of the noise-cancellation signal is any signal from which the amplitude of the noise-cancellation signal can be ascertained, including the noise-cancellation signal itself. In other examples, the signal representative of the noise-cancellation signal is the scaled noise-cancellation signal output from the amplifier. The scaling gain can be set in response to the signal representative of the noise-cancellation signal exceeding the threshold during an earlier sample.

References to samples, in this disclosure, refer to a noise-cancellation signal sample (i.e., an output sample of the noise-cancellation filter). The noise-cancellation signal samples are thus used to demarcate units of time during which the saturation control module 232 or noise-cancellation filter act.

After the amplifier applies a scaling gain of less than unity, saturation control module 232 can be further configured to ramp up the scaling gain (until the scaling gain is again at unity) over one or more of the following samples in order to avoid rapid and noticeable variations in the power of the noise-cancellation signal transduced by the speaker. This can occur over a predetermined period of time or over a variable period of time determined by the frequency at which the signal representative of the noise-cancellation signal exceeds the threshold. (Exceeding the threshold often is indicative of divergent coefficients or an error in a secondary path or driving in conditions causing the reference sensors to report large values and thus the scaling gain should ramp up more slowly to avoid exceeding the threshold multiple times in a short period.) In another example, a predetermined increment can be added to the scaling gain each sample following the signal representative of the noise-cancellation signal exceeding the threshold until the scaling gain is again at unity.

Saturation control module 232 can be implemented by a controller (e.g., controller 212). The controller includes a processor and a non-transitory storage medium comprising program code, which, when executed by the processor, implements the functions of the saturation control module 232. In an alternative example, the saturation control module can be implemented as hardware or as a combination of hardware, firmware, and/or software. The functions of saturation control module 232, which are carried out programmatically or otherwise, are described in more detail in connection with the flowcharts of FIGS. 5, 8, and 9.

Figure 4:
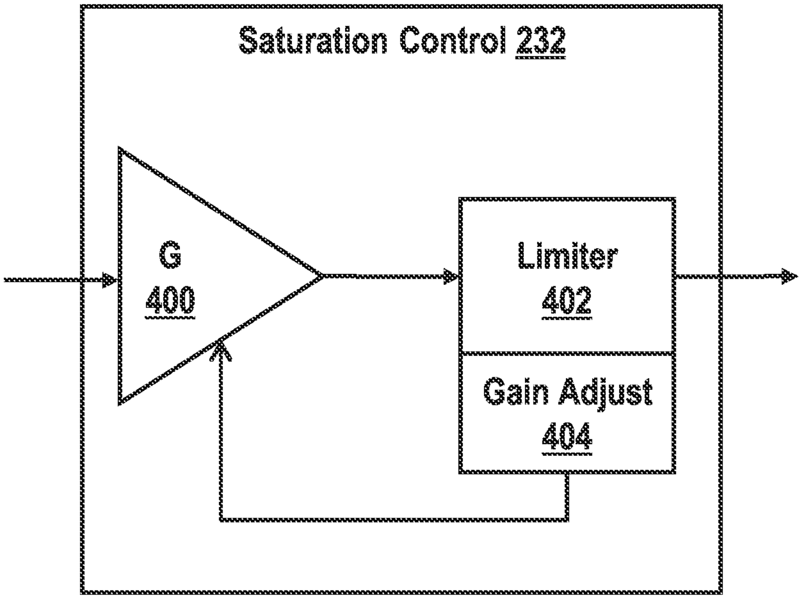
FIG. 4 depicts a block diagram of a saturation control module, according to an example.

FIG. 4 shows a first example of a saturation command module 232. Amplifier 400 receives the noise-cancellation signal and applies a scaling gain G, thus outputting, when the scaling gain G is less than unity, a scaled noise-cancellation signal that is a linearly scaled version of the noise-cancellation signal. The example of FIG. 4 further includes a limiter 402 at the output of amplifier 400, receiving the scaled noise-cancellation signal. In this example, the signal representative of the noise-cancellation signal is the scaled noise-cancellation signal output from the amplifier 400 and received at limiter 402. In the instance that the threshold of limiter 402 is reached for a given sample, the scaling gain of amplifier 400 (previously set at one) is set, for the next sample, by gain adjust module 404 according to the amount that scaled noise-cancellation signal exceeded the threshold of limiter 402. Thus, while limiter 402 may introduce non-linearities for the first sample, the scaling gain of amplifier 400 will linearly reduce the scaled noise-cancellation signal in an effort to prevent future samples from similarly reaching the threshold of limiter 402. (It should be understood, as mentioned above, that the saturation control module, including the amplifier and limiter, operate on digital signals and can be implemented programmatically in software or firmware.)

Figure 5A:
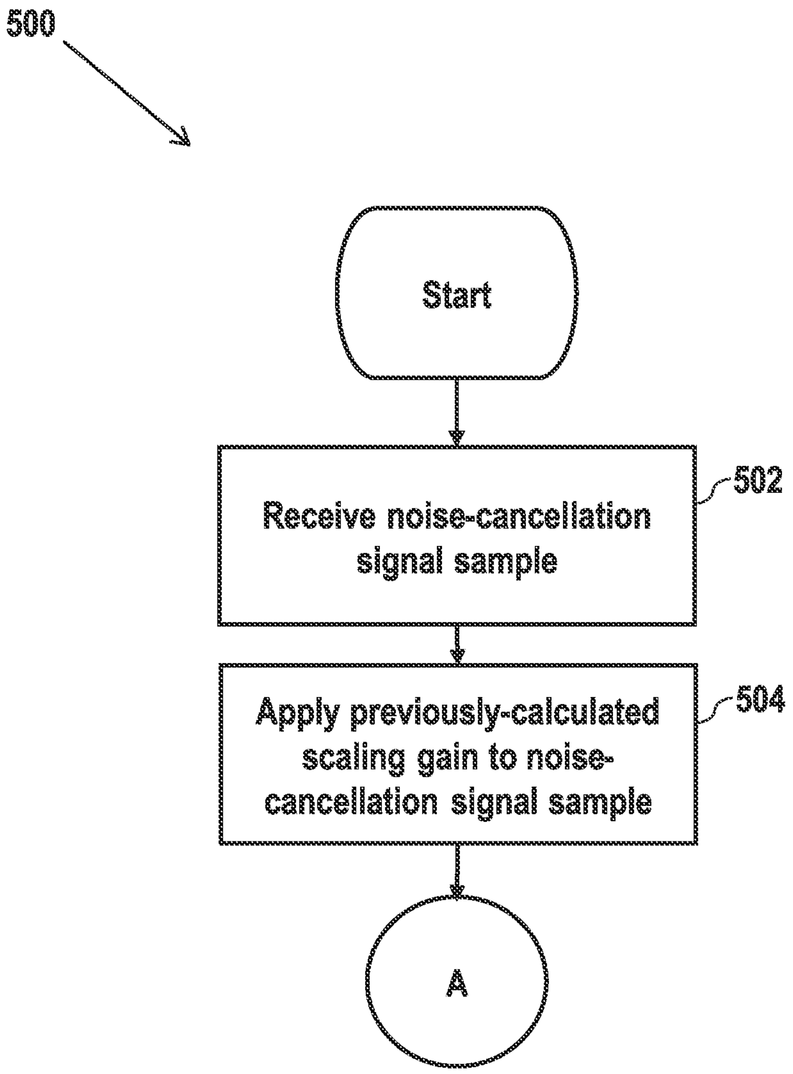
FIG. 5A depicts a flowchart of a method for saturation control, according to an example.

Turning to FIG. 5A, there shown a flowchart of the steps for implementing the saturation control module 232 topology depicted in FIG. 4. At step 502, the noise-cancellation signal sample is received at amplifier 400, which applies the previously calculated scaling gain to the noise-cancellation signal sample at step 504. At initialization of the noise-cancellation system, the previously calculated scaling gain is set to unity. Otherwise, the previously calculated scaling gain is the scaling gain calculated in response to the previous sample. As mentioned above, where the scaling gain is less than one, the output scaled noise-cancellation signal will be a linearly scaled version of the noise-cancellation signal. (When the scaling is equal to one, the scaled noise-cancellation signal will be the same as the noise-cancellation signal as the amplifier acts as a buffer.)

Figure 5B:
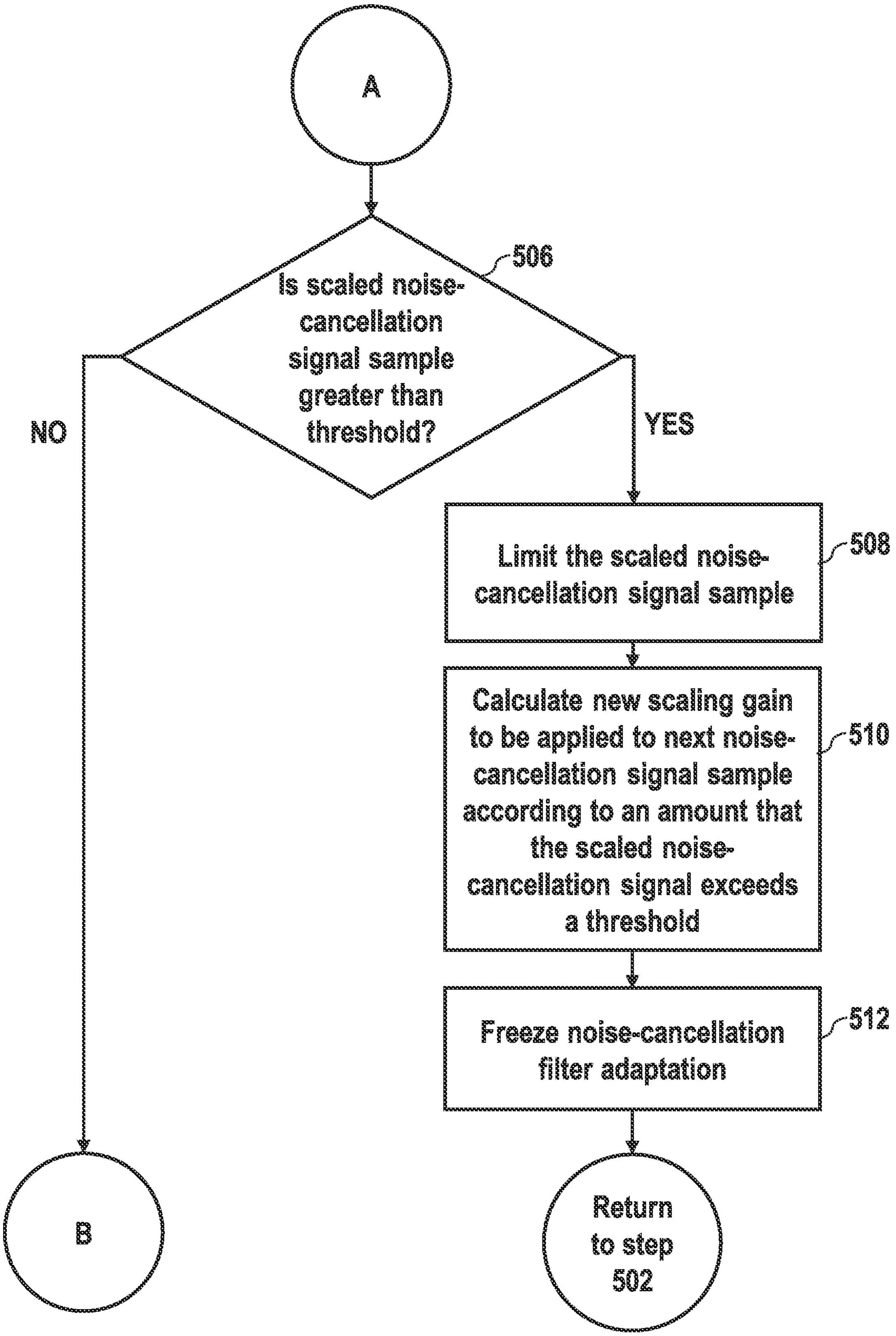
FIG. 5B depicts a flowchart of a method for saturation control, according to an example.
Figure 5C:
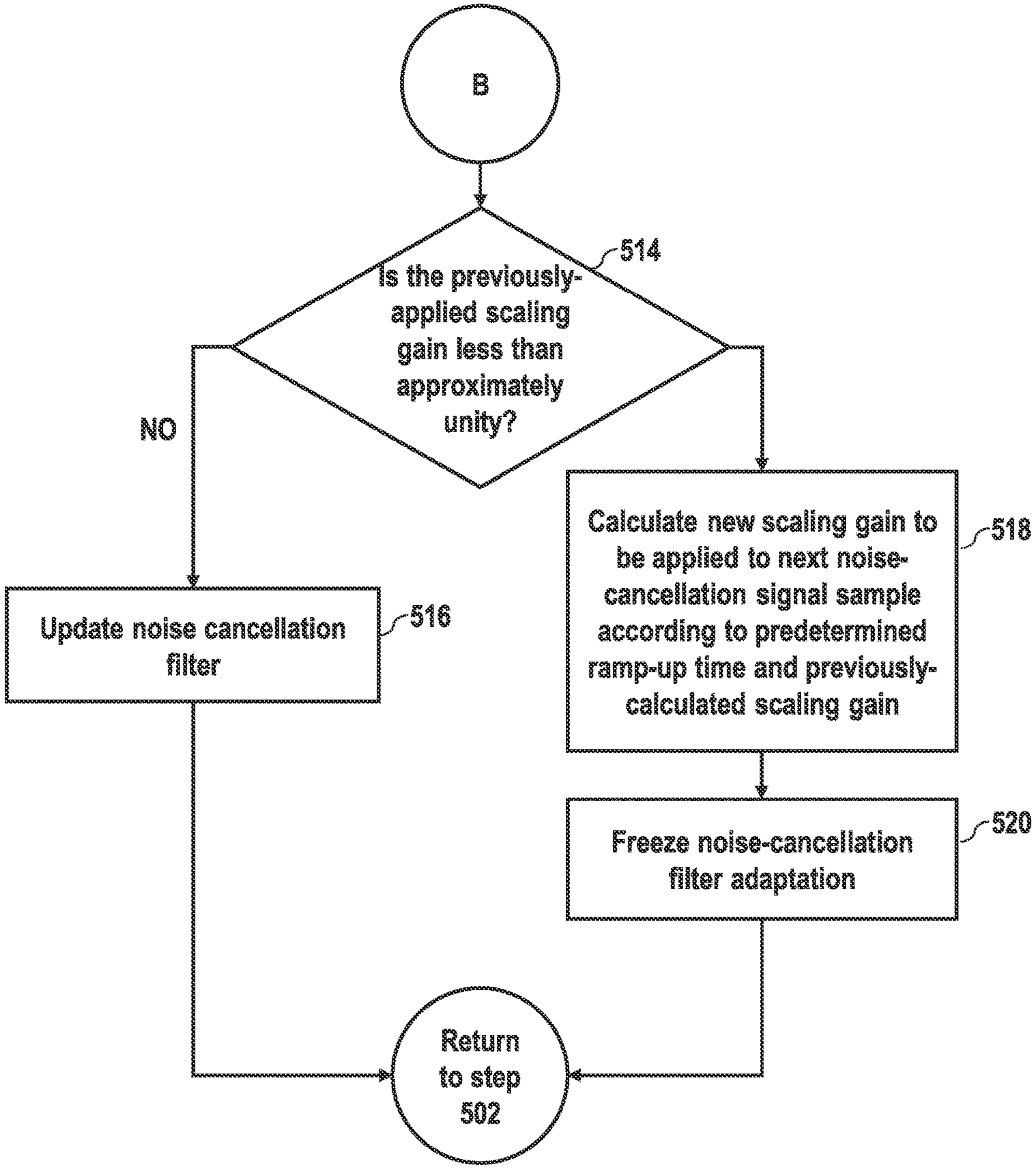
FIG. 5C depicts a flowchart of a method for saturation control, according to an example.
Figure 5D:
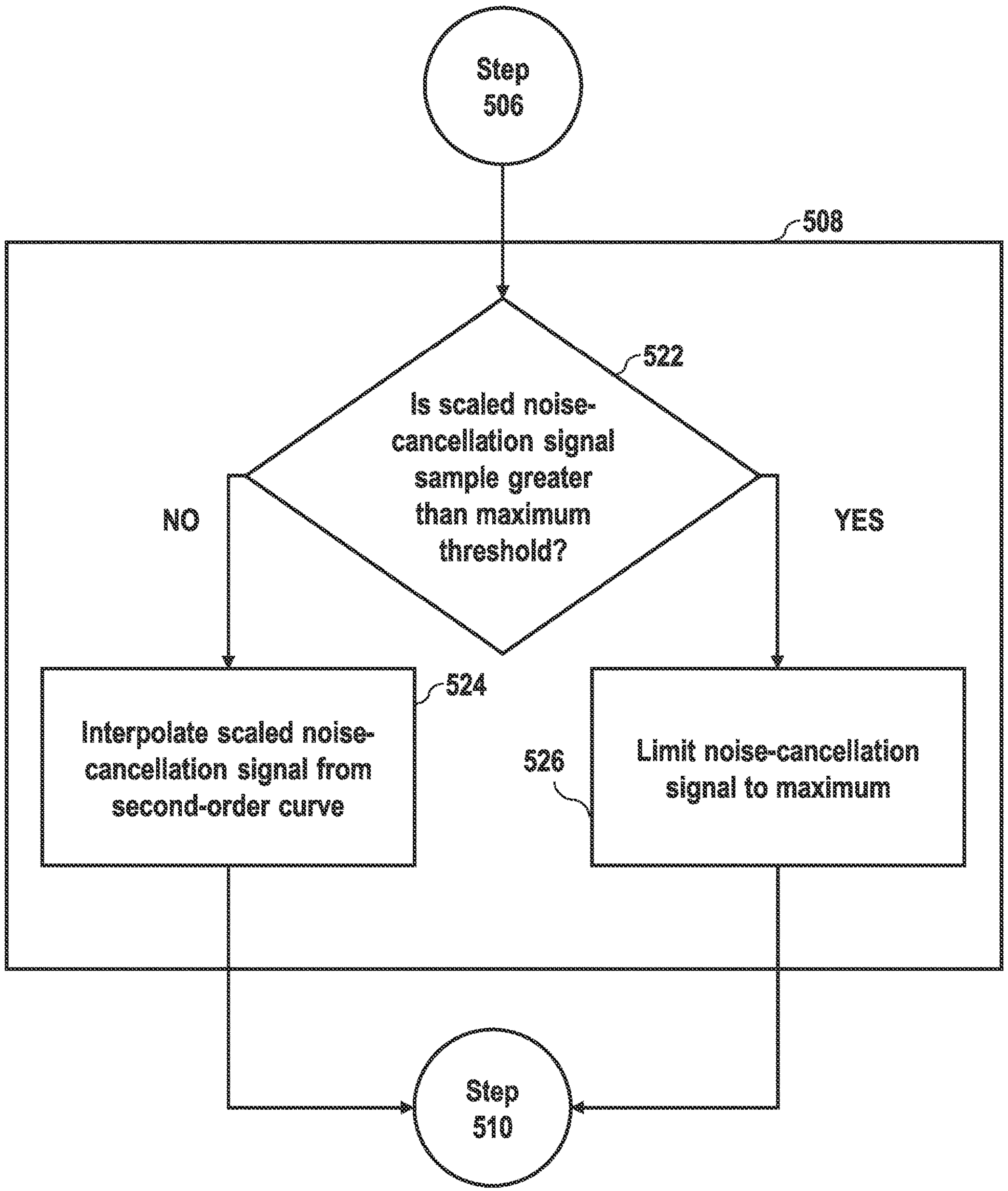
FIG. 5D depicts a flowchart of a method for saturation control, according to an example.

Turning to FIG. 5B, at step 506, the scaled noise-cancellation signal sample is compared to the threshold of the limiter 402. If the threshold of the limiter is met, the scaled noise-cancellation is limited by limiter 402 at step 508. FIG. 5D depicts an example operation of limiter 402. At step 522, the scaled noise-cancellation signal is compared to a maximum threshold of limiter 402. If the scaled noise-cancellation signal does not exceed the maximum threshold, then the scaled noise-cancellation signal is interpolated from a second-order curve at step 524. If the scaled noise-cancellation signal exceeds the maximum threshold, then the signal is clipped to the maximum threshold. Note that the flowchart of FIG. 5D assumes that the signal has already been compared to the threshold (in step 506) of the limiter. Generally speaking, however, the limiter performs step 506 as well. The operation of a limiter is generally understood and so additional explanation is omitted.

Returning to FIG. 5B, at step 510, the new scaling gain to be applied to the next sample is calculated by gain adjust module 404. The new scaling gain can be calculated according to the amount by which the scaled noise-cancellation signal exceeded the threshold of the limiter. This, however, requires that the gain be calculated in the context of the scaling gain previously applied by amplifier 400. Stated differently, the amount that the amplifier output exceeds the threshold of the limiter already does so with previously-calculated scaling again already applied. Thus, the new scaling gain can be calculated as the product of the scaling gain calculated according to the amount that the scaled noise-cancellation signal exceeded the threshold and the previously calculated scaling gain. For example, if the new scaling gain, based on the amplifier output is determined to be 0.8 and the previously calculated scaling gain is 0.9, then the scaling gain is calculated to be 0.72.

Alternatively, the new scaling gain can be calculated as the combination of the gain applied by the amplifier 400 and the adjustment of limiter 402. Stated differently, the new gain can be calculated as ratio of the limiter output and noise-cancellation signal. This can be conceived of as the total gain applied by saturation control module 232. The total gain applied by the saturation control module is based, at least in part, on the amount that the scaled noise-cancellation signal exceeds the threshold of the limiter, because that amount will dictate the adjustment of the limiter, which is factored into the calculation.

Any sample in which the threshold of the limiter is met will require that the adaptation of the noise-cancellation filter be frozen. This is shown, for example, as step 512 in FIG. 5B. The noise-cancellation filter is frozen is to avoid the result of any non-linear speaker signal being used to update the noise-cancellation filter. Similarly, when the amplifier 400 applies a gain of less than one, the noise-cancellation filter should be frozen; otherwise, the noise-cancellation filter will incorrectly interpret the increased error signal as being indicative of a need to increase the magnitude of the noise-cancellation signal. This is depicted in FIG. 5C, which includes the decision block 514, providing two paths depending on whether the amplifier 400 applied a gain of less than approximately unity. (Approximately unity refers a range of possible values for which the noise-cancellation filter will work within acceptable bounds. For the purposes of this disclosure, approximately unity will refer to any scaling gain greater than or equal to 0.95).

If the previously calculated scaling gain is less than approximately unity, the scaling gain for the next sample (i.e., the new scaling gain) is calculated according to a predetermined ramp up time and the previously calculated scaling gain. This ramp up time is designed to ensure that, once the scaling gain of less than unity is applied to the noise-cancellation signal, the saturation control module 232 does not immediately apply a unity gain to the next sample. Immediately applying unity gain to the next sample, where some condition has begun causing command signal saturation, would likely result in repeated applications of unity gain and scaling until the condition that caused the saturation resolved. Such rapid variation of the gain would be unpleasant and distracting for a user.

Accordingly, the ramp up time incrementally increases the gain over several samples from the previously calculated gain to unity. The size of the incremental change will depend, in part, on the difference between the previously calculated gain and unity. If the previously calculated gain is far from unity (e.g., 0.5), then larger steps per sample will be required to ramp the gain toward unity in the predetermined ramp up period. In contrast, if the previously calculated gain is near to unity (e.g., 0.89) then smaller increments are required to ramp the previously calculated gain toward unity in the same period of time. Because a ramp up time that covers only a single sample would defeat the purpose of the ramp up time, the ramp up time covers at least two samples.

Turning to the other side of the decision block instituted by step 514, if the previously calculated gain is greater than approximately unity, then the noise cancellation filter is updated. Following the completion of either step 516 or 520, a new sample is received from the noise-cancellation filter at step 502 and the process is repeated. Method 500 thus operates as a loop, repeating for each new sample of the noise-cancellation filter.

The predetermined ramp up time described in connection with step 518 represents one way to ramp up the signal following the application of a scaling gain less than unity. The predetermined ramp up time, as described above, will result in rapid changes when the scaling gain is farther from unity. This is not necessarily desirable, as a small scaling gain (i.e., one farther from unity) will typically represent some disturbance in the noise-cancellation system (e.g., diverging coefficients) that will often cause further disturbances. Accordingly, when the gain of the amplifier is scaled to a small amount, it is often more desirable to take longer to ramp up the scaling gain. One method for doing so is to add a predetermined increment to the scaling gain each following sample. For example, each sample following the application of a scaling gain less than approximately unity, an amount of 0.2 can be added to the previously determined scaling gain. Thus, if the scaling gain is farther from unity, it will take longer to ramp up to unity than if the scaling gain was nearer to unity.

Figure 5E:
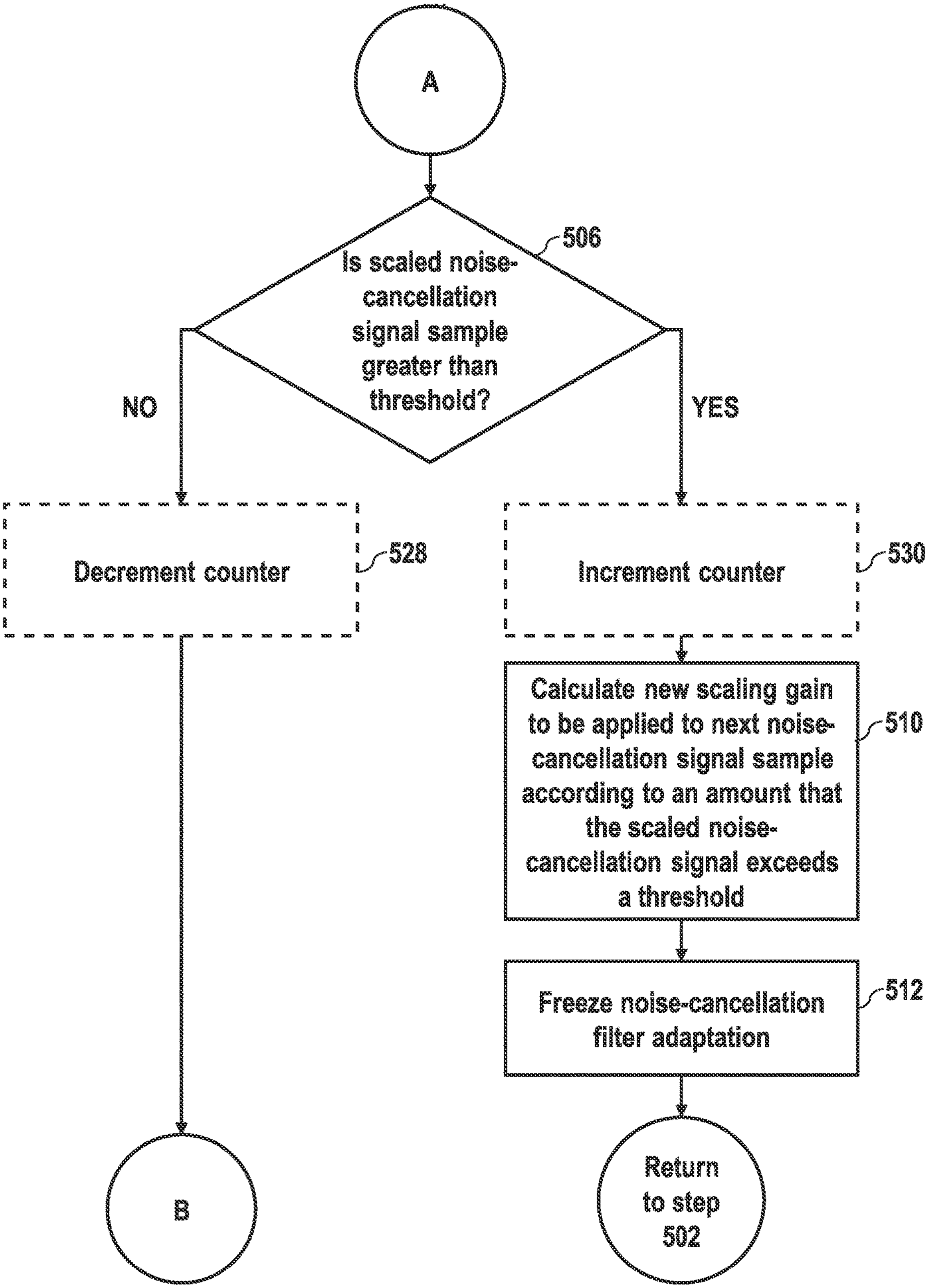
FIG. 5E depicts a flowchart of a method for saturation control, according to an example.
Figure 5F:
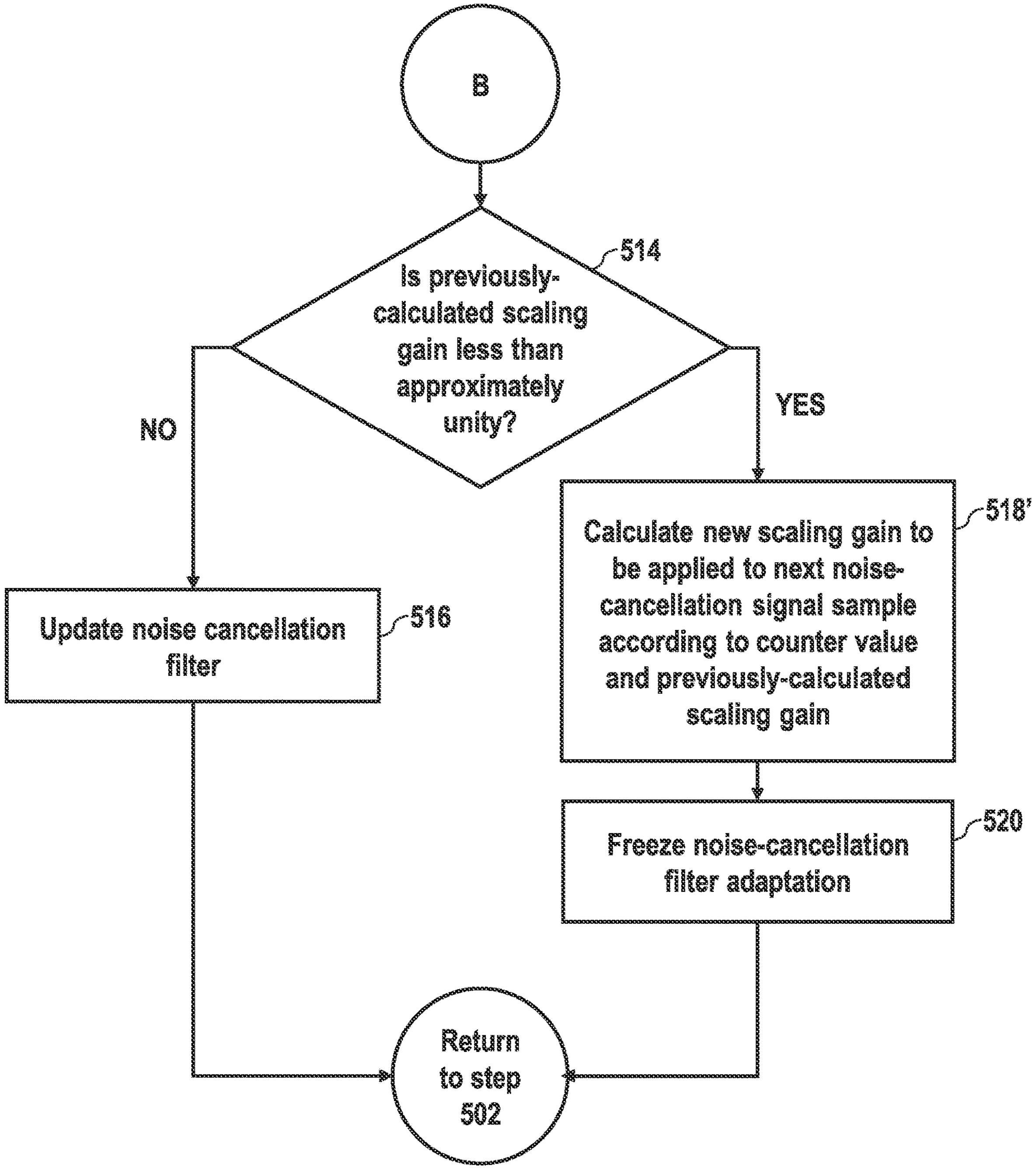
FIG. 5F depicts a flowchart of a method for saturation control, according to an example.

In another example, the ramp up time can itself be varied depending on factors such as the number of samples that saturated. This example is shown in FIGS. 5E-5F. FIGS. 5E-5F broadly follow the steps of FIGS. 5A-5D, and so they will only be described to the extent that they differ from FIGS. 5A-5D. As shown in FIGS. 5E-5F, a counter is instituted that is incremented (step 528) each time the threshold is met and decremented (step 530) each time the threshold is not met (these steps are shown in dotted lines to represent their additions to the examples shown in FIGS. 5A-5D). When, at step 518', a new scaling gain is calculated, the ramp up time is determined according to the counter value. A higher counter value means that more samples have exceeded the threshold, and thus saturation control 232 should ramp up more slowly. By contrast, a lower counter value will result in a shorter ramp up time, as fewer samples have exceeded the threshold.

In an alternative example, the counter can determine whether the new scaling increases or decreases in size with respect to the previously calculated scaling gain. For example, the counter can determine the length of the ramp up time as described above; if, however, the counter exceeds a threshold value, the new scaling gain can be set to a value that is lower than the previously calculated scaling gain. This can be implemented as a precautionary measure as a result of the signal representative of the noise-cancellation signal exceeding the threshold repeatedly in a short period of time.

When applying a longer ramp up time, the increment added to the previously calculated scaling gain is smaller than the increment added to the previously calculated scaling gain when the applying a shorter ramp up time. Thus, for each sample, the difference between the previously calculated scaling gain and the newly calculated scaling gain is inversely related to the value of the counter, with the largest increment being applied when the value of the counter is held to zero. While a counter is a useful method for determining the frequency at which the amplifier output exceeds the threshold, any other suitable method can be used.

Implementing the ramp up time may require the use of a counter or flag to denote how that saturation control module 232 is in a ramp up state. For example, in order to return to unity within a predetermined ramp up time, a certain sized increment must be added each sample. Thus for the sample in which the ramp up time is calculated, the increment size can be stored in memory and a flag can be set to indicate that the stored increment size be used until unity gain is restored (or until the limiter threshold is again met, which will reset the ramp up). This can alternately be accomplished with a counter that counts a determined number of samples.

Figure 6:
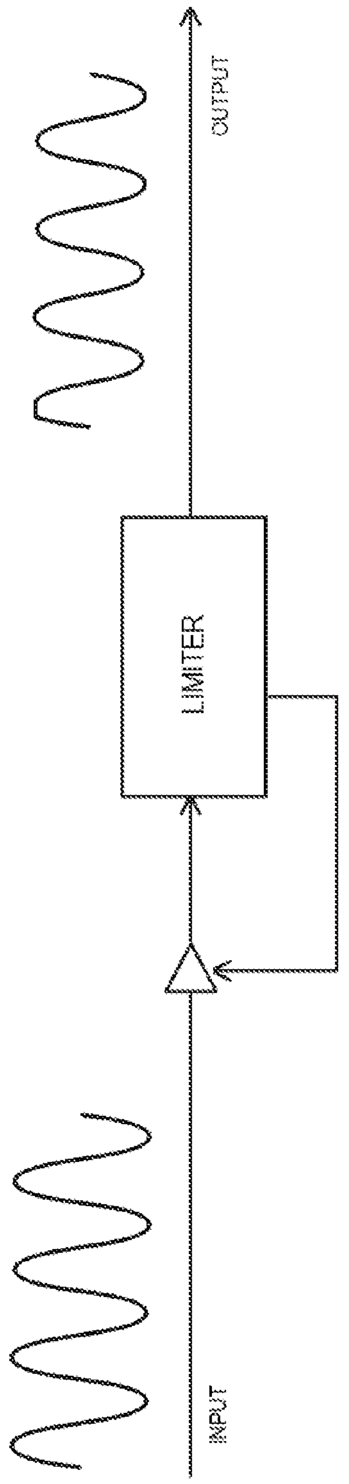
FIG. 6 depicts a block diagram of the operation of a saturation control module, according to an example.

FIG. 6 depicts a simplified example of the operation of saturation control module 232 of FIG. 4. Thus, during the first half-cycle, while the gain of the amplifier 400 is set to one (i.e., unity gain), the amplitude of the input signal exceeds the threshold of the limiter and is thus clipped at the output. This is shown as the flat peak of the first half-cycle at the output. Thereafter, the scaling gain of the amplifier is set according to the amount by which the input signal exceeded the threshold. The output signal is thus linearly scaled after the first half cycle. But since the output signal is linearly scaled, rather than being clipped by the limiter, there are no non-linearities present in the signal. Accordingly, while the noise-cancellation signal is scaled, the speaker will output a lower-amplitude noise-cancellation signal, which will still cancel the noise in the vehicle cabin (or in whatever context the noise-cancellation system is deployed) but will not add noise to the cabin due to non-linearities. FIG. 6 does not depict ramping the gain of amplifier 400 over time following the signal exceeding the threshold of the limiter.

Figure 7:
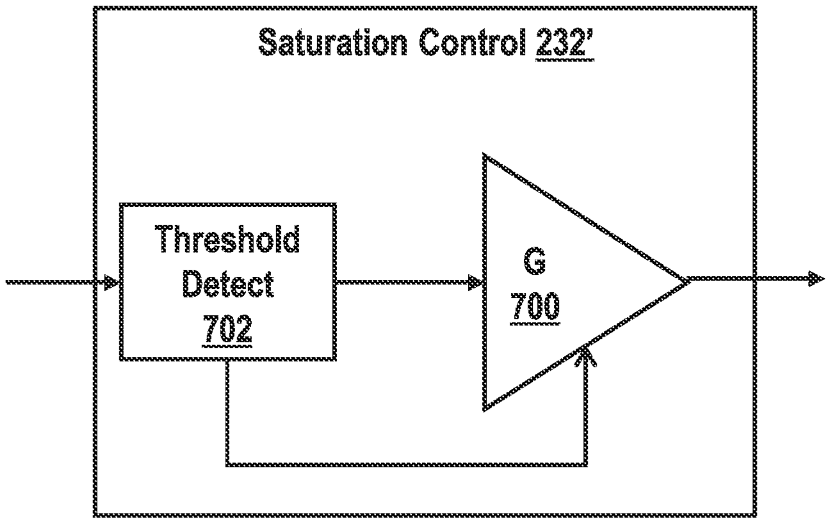
FIG. 7 depicts of a block diagram of a saturation control module, according to an example.

FIG. 7 depicts an alternate example of saturation control module 232. In this example, rather than using the scaled noise-cancellation signal as the signal representative of the noise-cancellation signal, the noise-cancellation signal itself (i.e., the output of the noise-cancellation filter) is used. Saturation control module 232' thus includes, in addition to amplifier 700, a threshold detect module 702, which compares the noise-cancellation signal to a threshold. If the noise-cancellation signal exceeds the threshold, the gain of the noise-cancellation signal is set according to the amount of the noise-cancellation signal that exceeded the threshold.

FIGS. 8A-8D depict a flowchart of a method describing the operation of topology shown in FIG. 7. At step 802, the noise-cancellation signal is received from the noise-cancellation filter. At step 804, this is compared by threshold detect 702 to a predetermined threshold. Typically, this threshold will be set at or below the value at which the noise-cancellation signal saturates. If the noise-cancellation signal exceeds the threshold, then the scaling gain of the amplifier 700 is adjusted according to an amount by which the noise-cancellation signal exceeds the threshold. As a result, the noise-cancellation signal is linearly scaled to a value that will not saturate.

This can be shown as follows:

$$y(n)_{out} = \begin{cases} Gy(n), & \text{if any } (|y(n)| > Th) \\ y(n), & \text{otherwise} \end{cases} \tag{2}$$

y(n) is the noise-cancellation signal vector at the current sample. If the level of the signals crosses the threshold Th, the entire output signals vector is scaled by a factor G. (Otherwise, a gain of one is applied.) In some examples, the scaling factor G may be computed as follows:

$$G = \frac{Th}{\max(|y(n)|)} \tag{3}$$

Stated plainly, the gain is selected such that the maximum of the noise-cancellation signal vector is only as large as the predetermined threshold. In some examples, the scaling factor G is computed based on a fixed threshold that is common across all speaker channels. However, the threshold can vary between speaker channels. It can also be dynamically changed based on an estimate of the noise to be controlled (e.g., the road noise level).

At step 808, the noise-cancellation filter adaptation is frozen in response for each sample for which the amplifier 700 applies a gain of less than unity. As described above, this prevents the noise-cancellation system treating the error signal resulting from the scaled noise-cancellation signal as valid.

If the previously applied scaling gain (e.g., the gain applied by amplifier 500 to the most recent noise-cancellation signal sample) is less than approximately unity, the scaling gain of amplifier 700 is set according to a predetermined ramp up time and the previously applied scaling gain. As described in connection with FIG. 5C, this ramp up time is designed to ensure that, once the scaling gain of less than unity is applied to the noise-cancellation signal, the saturation control module 232' does not immediately apply a unity gain the next sample.

Following the ramp up time, the scaling gain of the amplifier is incrementally increased over several samples from the previously calculated gain to unity. The size of the incremental change will depend, in part, on the difference between the previously calculated gain and unity. If the previously calculated gain is far from unity (e.g., 0.5), then larger steps per sample will be required to ramp the gain toward unity in the predetermined ramp up period. In contrast, if the previously calculated gain is near to unity (e.g., 0.89) then smaller increments are required to ramp the previously calculated gain toward unity in the same period of time. Because a ramp up time of a single sample would defeat the purpose of the ramp up time (which is designed to stretch the process of ramping up to unity over multiple samples), the ramp up time covers at least two samples.

Because the scaling gain of the amplifier 700 is set to less than unity, adaptation of the noise-cancellation filter is frozen at step 816.

Turning to the other side of the decision block instituted by step 812, if the previously calculated gain is greater than approximately unity, then the noise cancellation filter is updated. Following the completion of either step 812 or 816, a new sample is received from the noise-cancellation filter at step 802 and the process is repeated. Method 800 thus operates as a loop, repeating for each new sample of the noise-cancellation filter.

Like the example of FIG. 5, the predetermined ramp up time described in connection with step 814 represents one way to ramp up the signal following the application of a scaling gain less than unity. The predetermined ramp up time, as described above, will result in rapid changes when the scaling gain is farther from unity. This is not necessarily desirable, as a small scaling gain (i.e., one farther from unity) will typically represent some disturbance in the noise-cancellation system (e.g., diverging coefficients) that will often cause further disturbances. Accordingly, when the gain of the amplifier is scaled to a small amount, it is often more desirable to take longer to ramp up the scaling gain. Accordingly, in an alternate example, a predetermined increment is added to the scaling gain each following sample. For example, each sample following the application of a scaling gain less than approximately unity an amount of 0.2 can be added to the previously determined scaling gain. Thus, if the scaling gain is farther from unity, it will take longer to ramp up to unity than if the scaling gain was nearer to unity.

Figure 8A:
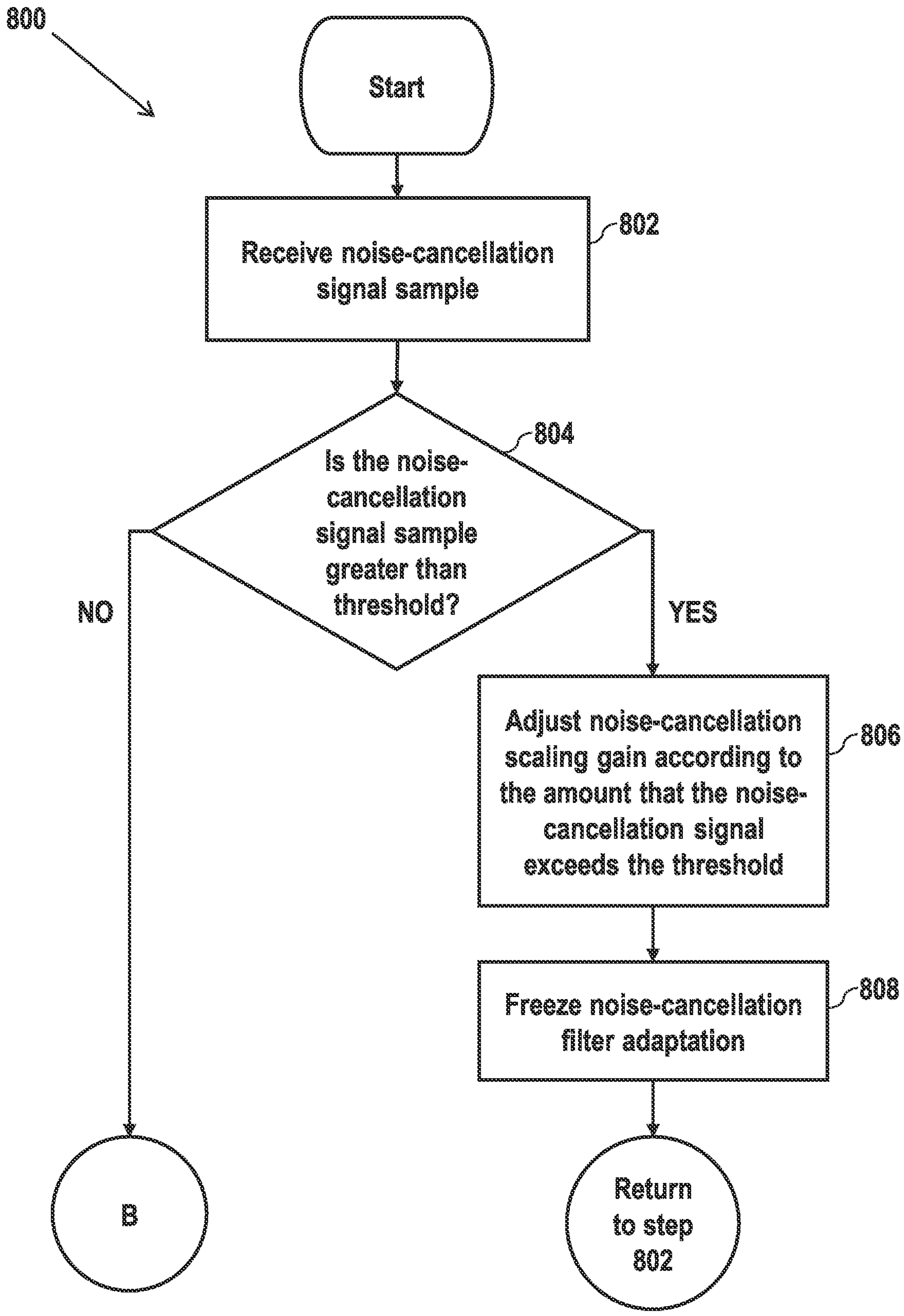
FIG. 8A depicts a flowchart of a method for saturation control, according to an example.
Figure 8B:
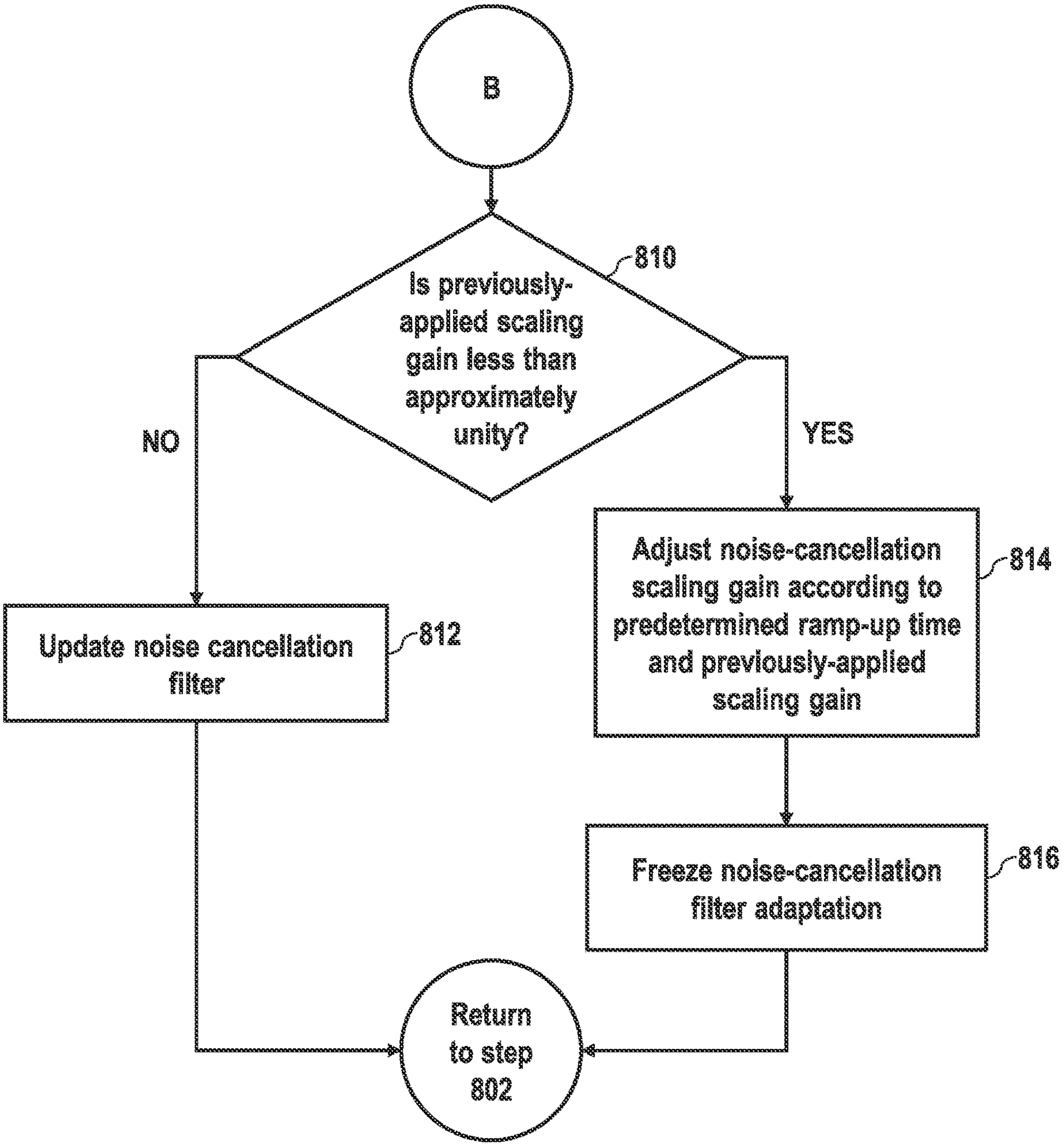
FIG. 8B depicts a flowchart of a method for saturation control, according to an example.
Figure 8C:
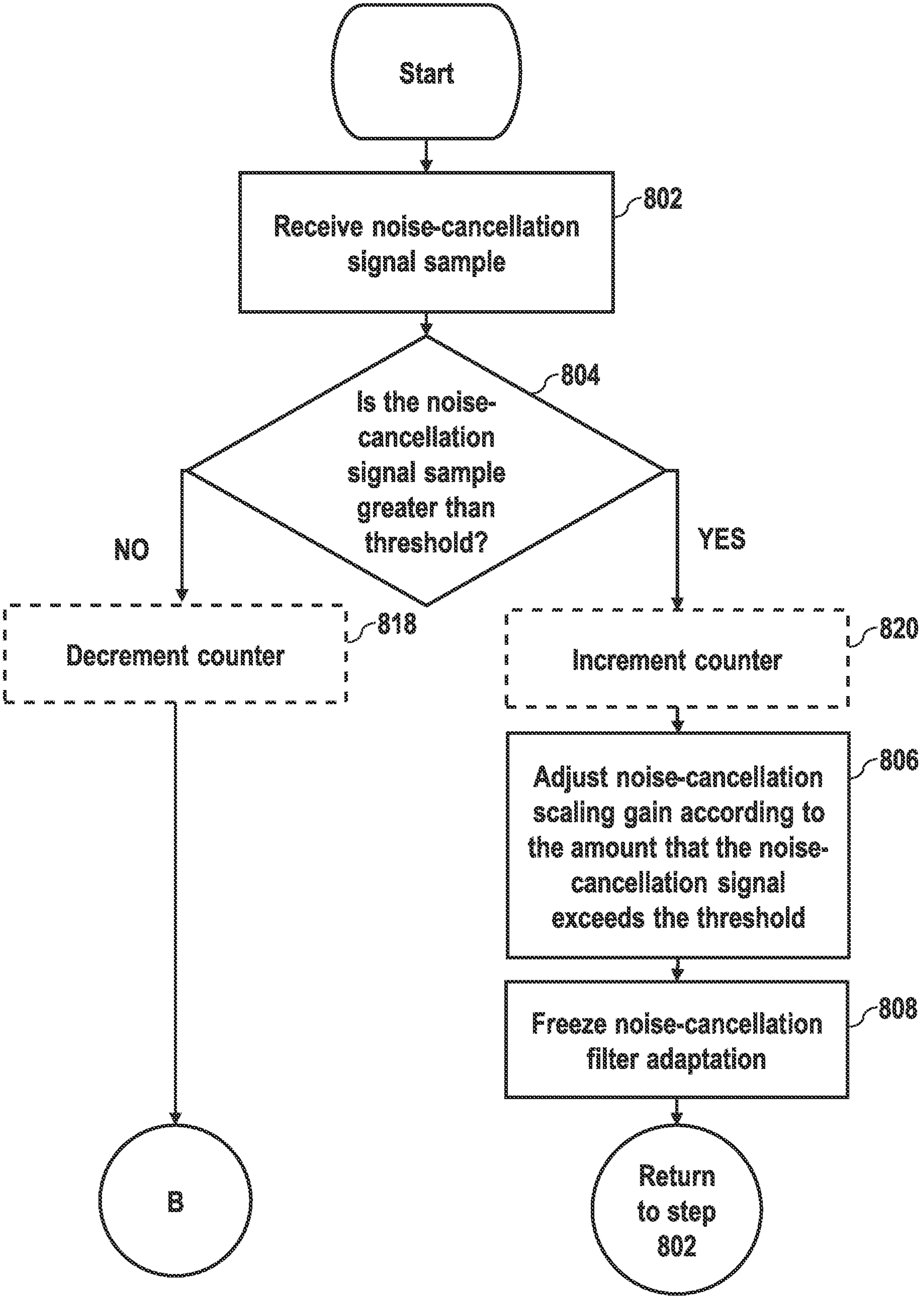
FIG. 8C depicts a flowchart of a method for saturation control, according to an example.
Figure 8D:
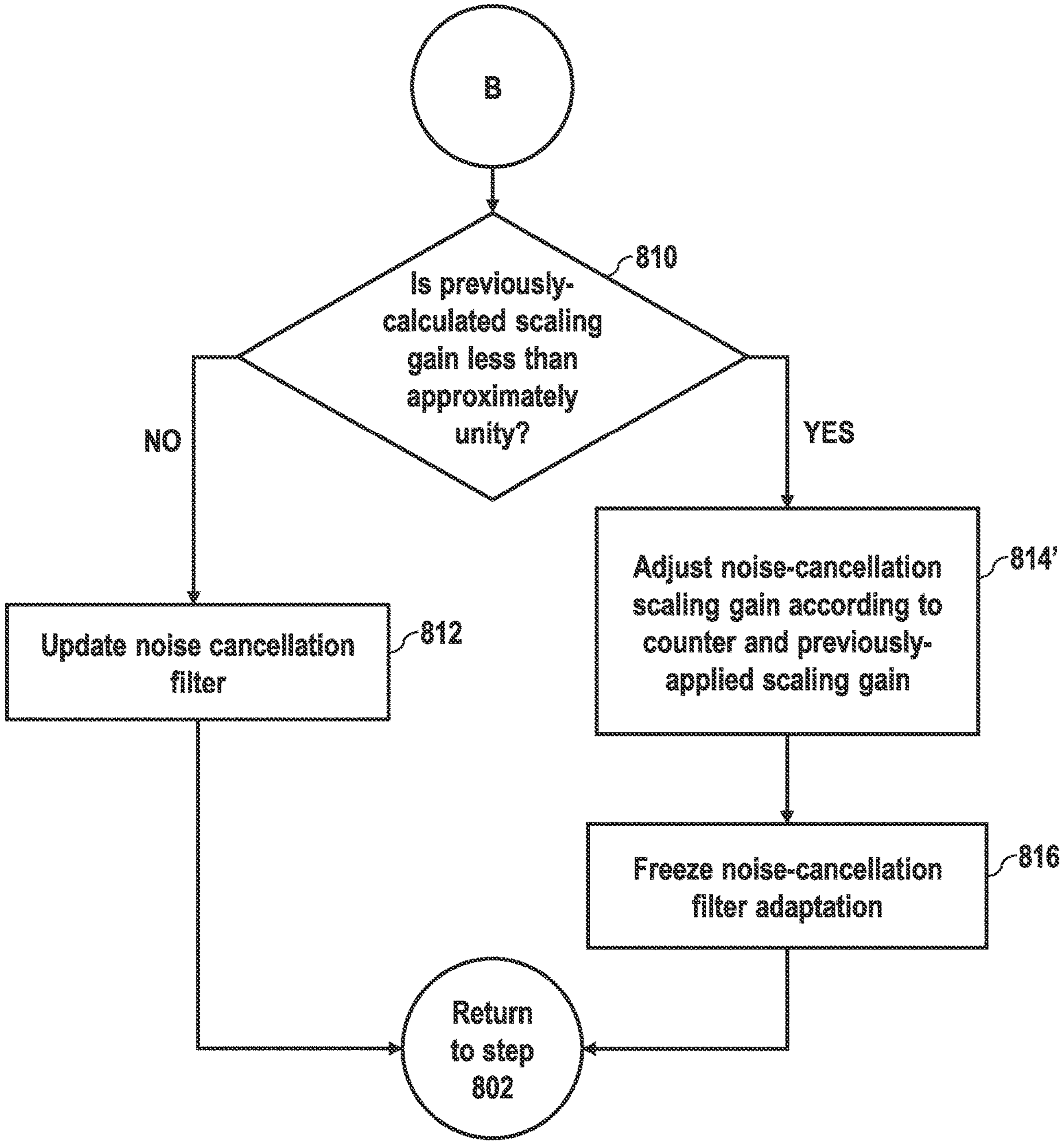
FIG. 8D depicts a flowchart of a method for saturation control, according to an example.
Figure 9A:
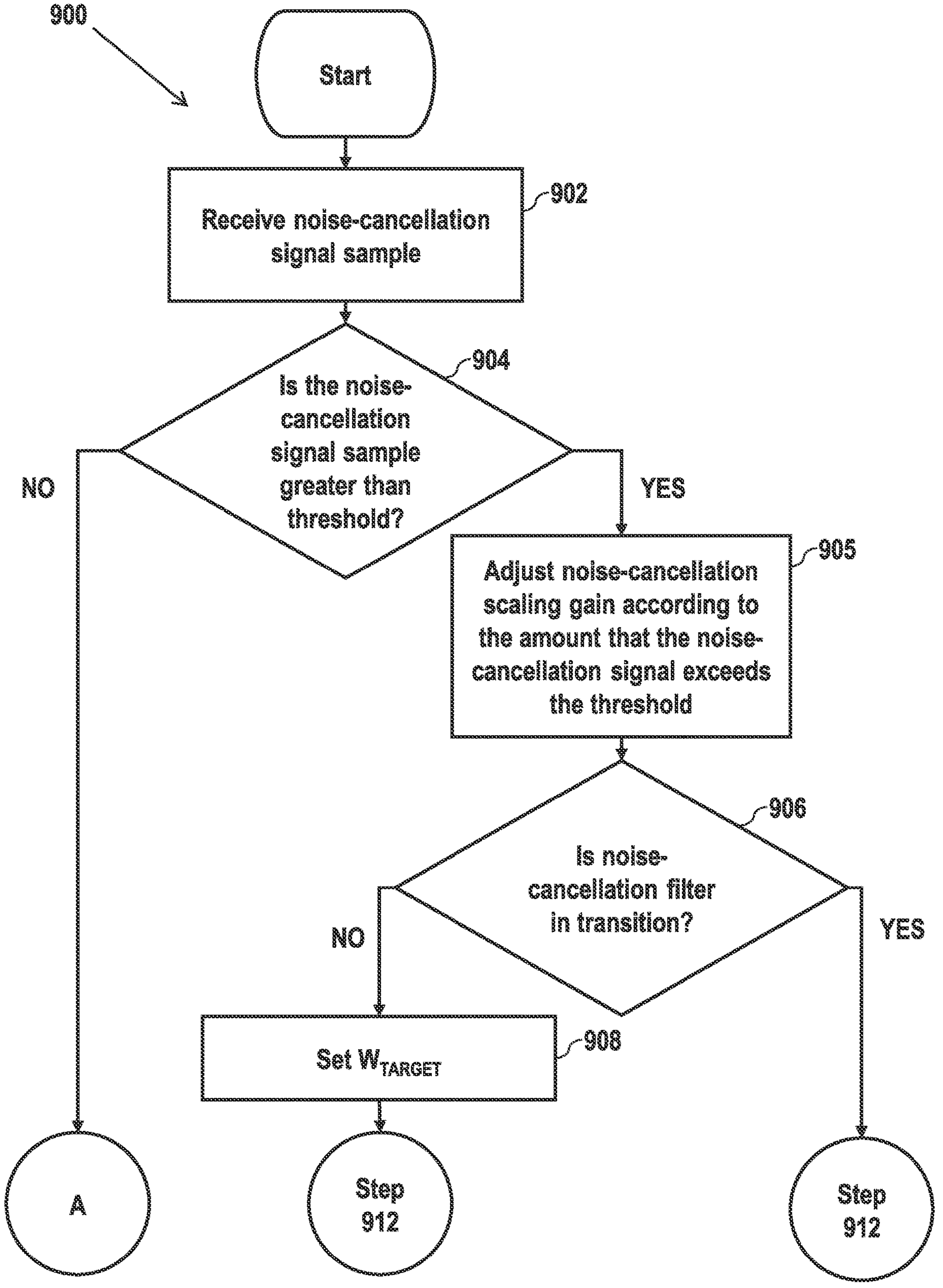
FIG. 9A depicts a flowchart of a method for saturation control, according to an example.
Figure 9B:
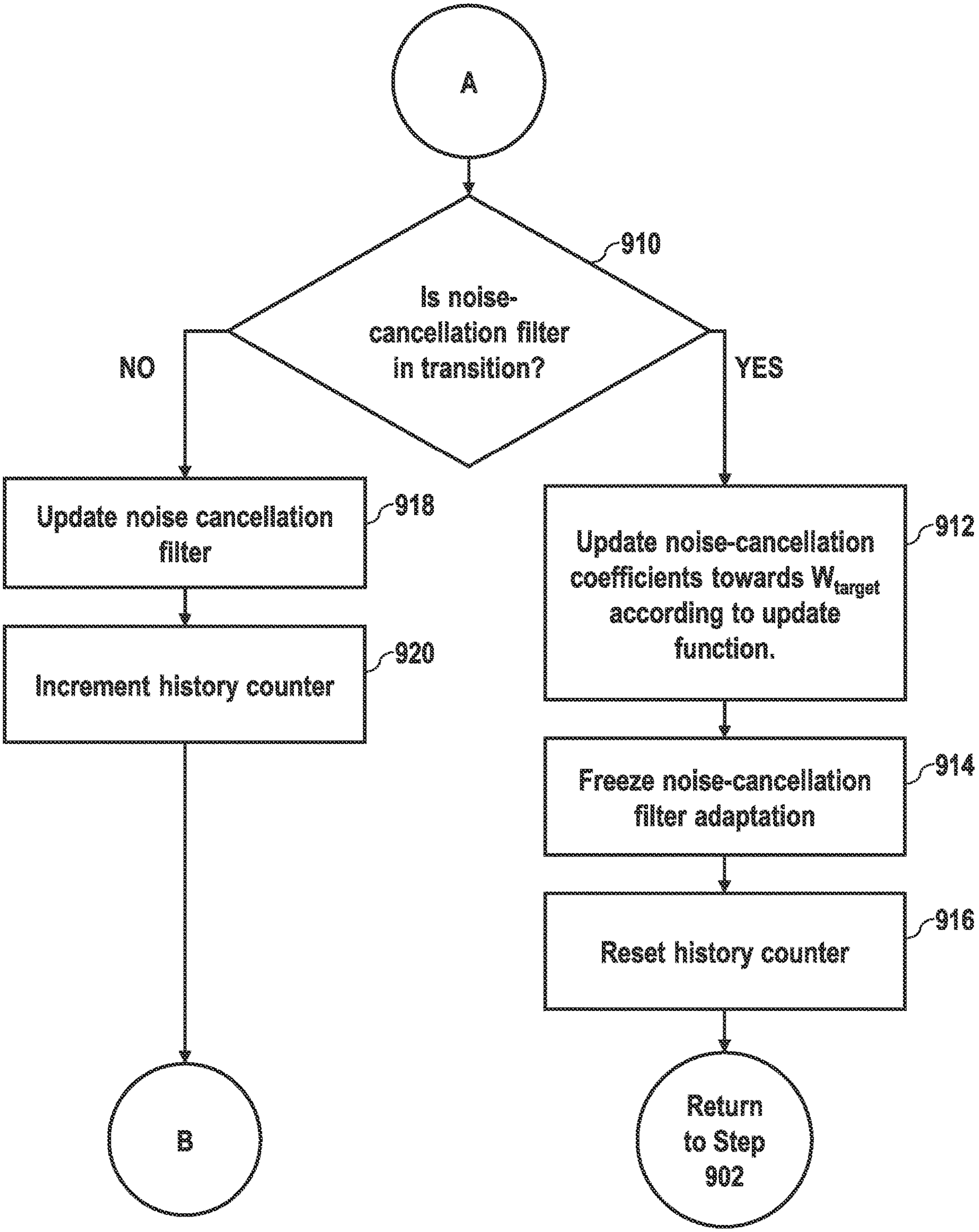
FIG. 9B depicts a flowchart of a method for saturation control, according to an example.
Figure 9C:
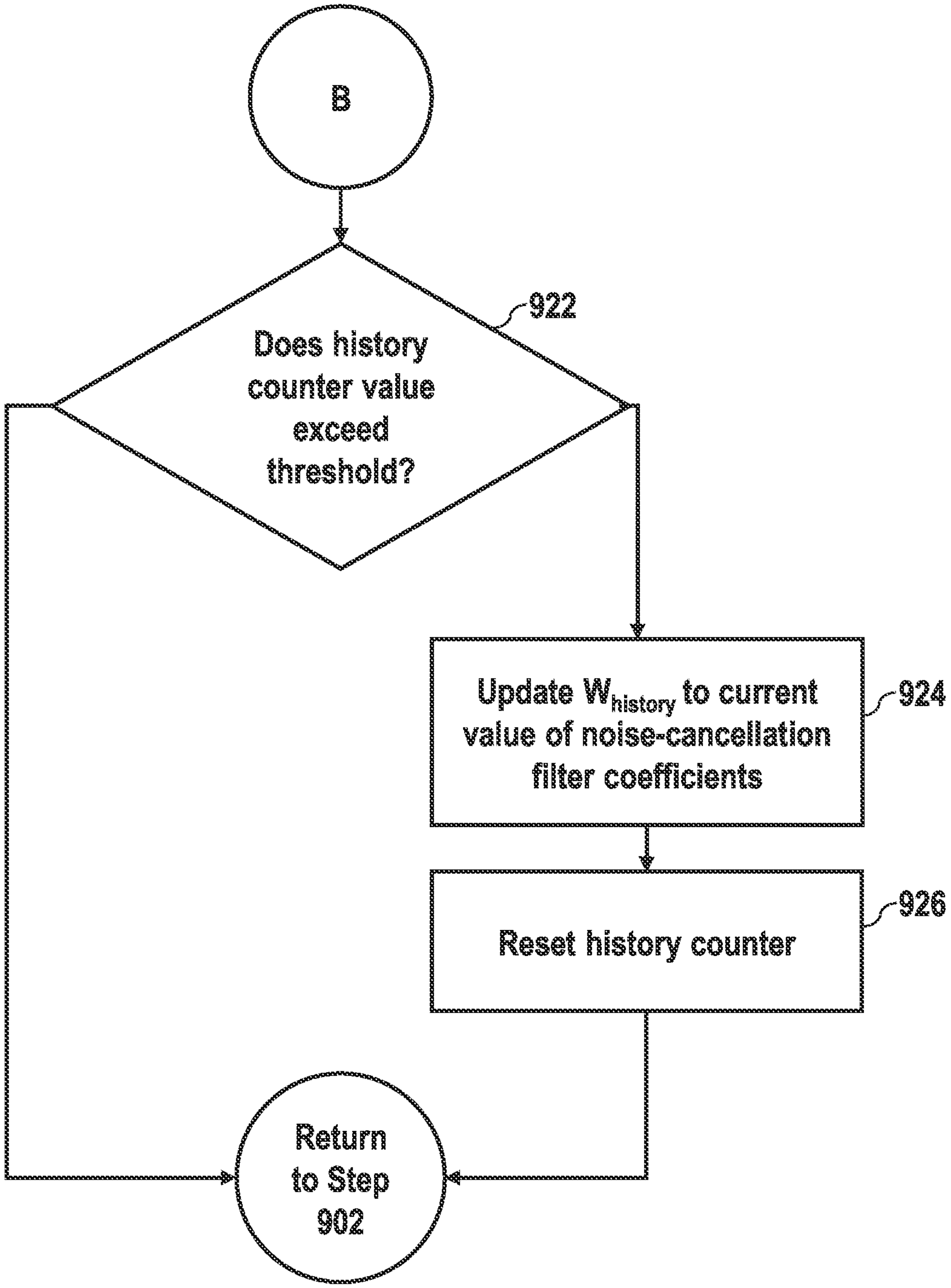
FIG. 9C depicts a flowchart of a method for saturation control, according to an example.

In another example, the ramp up time can itself be varied depending on factors such as the number of samples that saturated. This example is shown in FIGS. 8C-8D. FIGS. 8C-8D broadly follow the steps of FIGS. 8A-8B, and so they will only be described to the extent that they differ. Like example of FIGS. 5E-5F, a counter is instituted that is incremented (step 824) each time the threshold is met and decremented (step 822) each time the threshold is not met. When, at step 834, a new scaling gain is calculated, the ramp up time is determined according to the counter value. A higher counter value means that more samples have exceeded the threshold, and thus saturation control 232' should ramp up more slowly. By contrast, a lower counter value will result in a shorter ramp up time, as fewer samples have exceeded the threshold.

When applying a longer ramp up time, the increment added to the previously calculated scaling gain is smaller than the increment added to the previously calculated scaling gain when the applying a shorter ramp up time. Thus, for each sample, the difference between the previously calculated scaling gain and the newly calculated scaling gain is inversely related to the value of the counter, with the largest increment being applied when the value of the counter is held to zero. While a counter is a useful method for determining the frequency at which the amplifier output exceeds the threshold, any other suitable method can be used.

Implementing the ramp up time may require the use of a counter or flag to denote how that saturation control module 232' is in a ramp up state. For example, in order to return to unity within a predetermined ramp up time, a certain sized increment must be added each sample. Thus for the sample in which the ramp up time is calculated, the increment size can stored in memory and a flag can be set to indicate that the stored increment size be used until unity gain is restored (or until the limiter threshold is again met, which will reset the ramp up). This can alternately be accomplished with a counter that counts a determined number of samples.

In an alternative example, rather than only applying scaling gain, the noise-cancellation filter can, upon the noise-cancellation signal exceeding the threshold, begin transitioning the coefficients toward a target set of coefficients. An example of this shown in FIGS. 9A-9C. At step 902, a noise-cancellation signal is received. At step 904 the noise-cancellation signal sample is compared to the signal threshold. If the noise-cancellation signal sample exceeds the threshold, a scaling gain is applied according to the amount that the noise-cancelation signal exceeds the threshold. As described above, this can be accomplished according to equations (2) and (3).

In other examples, the output signals may be adjusted in a smoother fashion. For example, as any of the output signals approaches a threshold value, the output signals may be adjusted by a limiter that implements a smoother transition to a maximum value, beyond which the adjusted output signal is not allowed to go. Various limiters are known in the art and may include input-output curves having various linear regions of differing slope (e.g., with knees or bends therebetween) and/or curves, such that beyond a certain input value all output values are or approach a maximum (e.g., limited) value.

In addition to or instead of limiting such output signals (e.g., anti-noise signals, command signals), various examples may adjust the control coefficients (e.g., the coefficients of a filter, such as an adaptive filter operating on a reference signal to generate the anti-noise signal/command signal). To reduce the command signal, a set of new target control coefficients $W_{Target}$ may be calculated or selected, and a transition to the new target control coefficients $W_{Target}$ may be initiated. This is shown in step 906, which is decision block that inquires whether the noise-cancellation filter is in transition. This is to determine whether the filter has begun transitioning toward the target set of coefficients at an earlier sample. If the transition has not begun at an earlier sample, the target set of coefficients is set at step 908. In various examples it may be desirable to select the new target control coefficients $W_{Target}$ in various ways and based on specific situations. For example, new target control coefficients $W_{Target}$ may be selected based upon the following and/or other ways:

KW(n): the target control coefficients may be a scaled version of the current control coefficients. This might be the preferred choice when saturation occurs due to large reference signals. In some examples, a scaling factor K may be based on a fixed scaling factor, such as 0.95 or 0.9 or another predetermined value. In other examples, the scaling factor K may be based on a sample-by-sample scaling factor G as described above, and the scaling factor K may be based on a minimum scaling factor G that occurs over a period of time and/or a frame of samples. In other examples, the scaling factor K may be based on a ratio of maximum allowed output level to other recently calculated output signal levels.

$W_{History}$: the target control coefficients may be a previously computed good solution. In some examples, a previously computed good set of control coefficients may provide enhanced performance, such as when divergence is detected or when divergence is the cause for saturation. The control coefficients may be transitioned back to the last computed good solution. Various examples may include convergence and/or divergence detectors. A convergence detector may indicate when a computed set of control coefficients is a good set (e.g., from a converged system) to be stored for future retrieval, and a divergence detector may indicate whether a command saturation is caused by divergence (e.g., which may indicate a good choice to revert to a previously stored set of good control coefficients). Accordingly, a convergence detector may be used to assess the current solution and store it in history if it is deemed a good solution, while a divergence detector may be used to detect divergence and initiate a transition to the (stored) known good solution.

$W_0$: the target control coefficients may be an initialized or fixed solution. The transition will result in resetting the algorithm. In some examples, this may be used as a last resort when the other solutions do not resolve a command signal saturation.

During a transition period, adaptation may be stopped and the control coefficients may, in some examples, undergo a transition to the target control coefficients in accord with the following:

$$W(n+1)=\alpha W(n)+(1-\alpha)W_{Target} \tag{4}$$

where W(n) is the set of control coefficients at the current sample or time step, W(n+1) is the set of control coefficients at the next sample or time step, $W_{Target}$ is the set of target control coefficients toward which the control coefficients are being transitioned, and α is a smoothing factor. α controls the duration of the transition period. A small value of α results in a faster transition but might result in audible steps, or pops, played out by the loudspeakers due to a more drastic change in the output.

At step 912, the coefficients are transitioned toward the target set of coefficients. For illustration, at the Nth sample of the transition period, the output control coefficients can be expressed as follows:

$$W(n_0+N)=\alpha^N W(n_0)+(1-\alpha^N)W_{Target} \tag{5}$$

$W(n_0)$ are the control coefficients at the start of the transition period. This equation can be used to choose a suitable value for α. For example, if the transition period is defined as 1 second at 2 kHz sampling rate, α may be set to, e.g., $$\sqrt[2000]{0.01} = 0.9977$$

to ensure that at the end of the transition period, 99% of the target control coefficients are reached.

If the coefficients are in transition, the noise-cancellation filter adaptation, in response to the error signal and input from the reference sensor, must be frozen in order to ensure that the transition continues without interruption. Thus, at step 914 adaptation of the noise-cancellation is frozen.

If the noise-cancellation filter is not in transition, the adaptation can be resumed at step 918. During the adaptation period, a history counter may be updated at step 920 until a threshold is reached. Once the threshold is reached, the adapted control coefficients may be deemed good coefficients and $W_{History}$ may be updated with the current solution (the current control coefficient values), and the history counter may be reset. This ensures that a certain duration of convergence (without saturation) has passed before storing the current solution in the history.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A noise-cancellation system, comprising:

a noise-cancellation filter in communication with at least one speaker, the noise-cancellation filter generating a noise-cancellation signal;

an amplifier disposed between the noise-cancellation filter and the at least one speaker, the amplifier applying a first scaling gain to a current sample of the noise-cancellation signal and outputting a scaled noise-cancellation signal to the at least one speaker, the scaled noise-cancellation signal being a linear reduction of the current sample of the noise-cancellation signal when the first scaling gain is less than unity; and a limiter disposed between the amplifier and the at least one speaker;

wherein the first scaling gain is set to less than unity in response to a signal representative of the noise-cancellation signal exceeding a threshold, wherein, the scaled noise-cancellation signal, when actuated by the at least one speaker, cancels noise within at least one cancellation zone, wherein the signal representative of the noise-cancellation signal is the scaled noise-cancellation signal from a previous sample of the noise-cancellation signal, wherein the threshold is the threshold of the limiter.

2. The noise-cancellation system of claim 1, wherein the first scaling gain is determined, at least in part, according to an amount by which the signal representative of the noise-cancellation signal exceeds the threshold.

3. The noise-cancellation system of claim 1, wherein the amplifier applies a second scaling gain during a following sample, the second scaling gain being determined, at least in part, according to a predetermined ramp-up time and according to the value of the first scaling gain, wherein the second scaling gain has a higher value than the first scaling gain.

4. The noise-cancellation system of claim 1, wherein the amplifier applies a second scaling gain during a following sample, the second scaling gain being set equal to the first scaling gain summed with a predetermined value.

5. The noise-cancellation system of claim 1, wherein adaptation of the noise-cancellation filter is frozen during each sample that the amplifier applies a gain of less than approximately unity.

6. The noise-cancellation system of claim 1, wherein coefficients of the noise-cancellation filter are transitioned toward a target set of coefficients during a following sample.

7. A noise-cancellation system, comprising:

a noise-cancellation filter in communication with at least one speaker, the noise-cancellation filter generating a noise-cancellation signal; and an amplifier disposed between the noise-cancellation filter and the at least one speaker, the amplifier applying a first scaling gain to a current sample of the noise-cancellation signal and outputting a scaled noise-cancellation signal to the at least one speaker, the scaled noise-cancellation signal being a linear reduction of the current sample of the noise-cancellation signal when the first scaling gain is less than unity;

wherein the first scaling gain is set to less than unity in response to a signal representative of the noise-cancellation signal exceeding a threshold, wherein, the scaled noise-cancellation signal, when actuated by the at least one speaker, cancels noise within at least one cancellation zone, wherein the signal representative of the noise-cancellation signal is the scaled noise-cancellation signal from a previous sample of the noise-cancellation signal, wherein the amplifier applies a second scaling gain during a following sample, the second scaling gain being determined, at least in part, according to the value of a counter and according to the value of the first scaling gain.

8. The noise-cancellation system of claim 7, wherein the counter is incremented each sample the noise-cancellation signal exceeds the threshold and is decremented each sample the noise-cancellation signal does not exceed the threshold, wherein the difference between the value of the second scaling gain and the value of the first scaling gain is inversely related to the value of the counter.

9. A non-transitory storage medium comprising program code that, when executed by a processor, carries out the steps of:

generating, with a noise-cancellation filter, a noise-cancellation signal;

setting a first scaling gain of an amplifier disposed between the noise-cancellation filter and at least one speaker to less than unity in response to a signal representative of the noise-cancellation signal exceeding a threshold;

applying, with the amplifier, the first scaling gain to a current sample of the noise-cancellation signal such that the scaled noise-cancellation signal is a linear reduction of the current sample of the noise-cancellation signal; and outputting the scaled noise-cancelation signal to at least one speaker, wherein, the scaled noise-cancellation signal, when actuated by the at least one speaker, cancels noise within at least one cancellation zone, wherein the signal representative of the noise-cancellation signal is the scaled noise-cancellation signal from a previous sample of the noise-cancellation signal, wherein the threshold is the threshold of a limiter disposed between the amplifier and the at least one speaker.

10. The non-transitory storage medium of claim 9, wherein the first scaling gain is determined, at least in part, according to an amount by which the signal representative of the noise-cancellation signal exceeds the threshold.

11. The non-transitory storage medium of claim 9, further comprising:

setting the amplifier to a second scaling gain, the second scaling gain being determined, at least in part, according to a predetermined ramp-up time and according to the value of the first scaling gain, wherein the second scaling gain has a higher value than the first scaling gain; and applying the second scaling gain during a following sample.

12. The non-transitory storage medium of claim 9, further comprising: setting the amplifier to a second scaling gain, the second scaling gain being equal to the first scaling gain summed with a predetermined value; and applying the second scaling gain during a following sample.

13. The non-transitory storage medium of claim 9, wherein adaptation of the noise-cancellation filter is frozen during each sample that the amplifier applies a gain of less than approximately unity.

14. The non-transitory storage medium of claim 9, further comprising transitioning coefficients of the noise-cancellation filter toward a target set of coefficients during a following sample.

15. A non-transitory storage medium comprising program code that, when executed by a processor, carries out the steps of:

generating, with a noise-cancellation filter, a noise-cancellation signal;

setting a first scaling gain of an amplifier disposed between the noise-cancellation filter and at least one speaker to less than unity in response to a signal representative of the noise-cancellation signal exceeding a threshold;

applying, with the amplifier, the first scaling gain to a current sample of the noise-cancellation signal such that the scaled noise-cancellation signal is a linear reduction of the current sample of the noise-cancellation signal;

outputting the scaled noise-cancelation signal to at least one speaker, wherein, the scaled noise-cancellation signal, when actuated by the at least one speaker, cancels noise within at least one cancellation zone, wherein the signal representative of the noise-cancellation signal is the scaled noise-cancellation signal from a previous sample of the noise-cancellation signal;

setting the amplifier to a second scaling gain, the second scaling gain being determined, at least in part, according to a value of a counter and according to the value of the first scaling gain; and applying the second scaling gain during a following sample.

16. The non-transitory storage medium of claim 15, wherein the counter is incremented each sample the noise-cancellation signal exceeds the threshold and is decremented each sample the noise-cancellation signal does not exceed the threshold, wherein the difference between the value of the second scaling gain and the value of the first scaling gain is inversely related to the value of the counter.

* * * * *